(12) United States Patent
Ghosh et al.

(10) Patent No.: US 10,964,099 B2
(45) Date of Patent: Mar. 30, 2021

(54) IMAGE PROCESSING FOR DIFFUSE-SPECULAR SEPARATION

(71) Applicant: Imperial College Innovations Limited, London (GB)

(72) Inventors: Abhijeet Ghosh, London (GB); Christos Kampouris, London (GB); Alexandros Lattas, London (GB); Stefanos Zafeiriou, London (GB)

(73) Assignee: Imperial College Innovations Limited, London (GB)

( * ) Notice: Subject to any disclaimer, the term of this patent is extended or adjusted under 35 U.S.C. 154(b) by 1 day.

(21) Appl. No.: 16/459,200

(22) Filed: Jul. 1, 2019

(65) Prior Publication Data

US 2021/0005015 A1 Jan. 7, 2021

(51) Int. Cl.
*G06T 15/50* (2011.01)
*G01N 21/55* (2014.01)
*G06T 15/00* (2011.01)
*G06T 9/00* (2006.01)

(52) U.S. Cl.
CPC ............ *G06T 15/506* (2013.01); *G01N 21/55* (2013.01); *G06T 9/00* (2013.01); *G06T 15/005* (2013.01)

(58) Field of Classification Search
CPC ....... G06T 15/506; G06T 15/005; G06T 9/00; G01N 21/55
See application file for complete search history.

(56) References Cited

U.S. PATENT DOCUMENTS

| | | | |
|---|---|---|---|
| 3,747,755 A | 7/1973 | Senturia et al. | |
| 6,426,749 B1 | 7/2002 | Knittel et al. | |
| 6,803,910 B2 | 10/2004 | Pfister et al. | |
| 7,319,467 B2 | 1/2008 | Weyrich et al. | |
| 8,134,555 B2 | 3/2012 | Debevec et al. | |
| 2003/0011596 A1 | 1/2003 | Zhang et al. | |
| 2012/0268571 A1 | 10/2012 | Debevec et al. | |
| 2016/0261850 A1* | 9/2016 | Debevec | H04N 13/254 |
| 2018/0082440 A1* | 3/2018 | Nakamura | G06K 9/6212 |
| 2019/0139206 A1 | 5/2019 | Derakhshani | |

OTHER PUBLICATIONS

Wilson, C. A., Ghosh, A., Peers, P., Chiang, J.-Y., Busch, J., and Debevec, P. 2010. Temporal upsampling of performance geometry using photometric alignment. ACM Trans. Graph. 29, 17:1-17:11. (Year: 2010).*

(Continued)

*Primary Examiner* — Grace Q Li
(74) *Attorney, Agent, or Firm* — Nixon Peabody LLP; Linda B. Huber

(57) ABSTRACT

A method of image processing includes receiving a set of images of an object, the set of images including images corresponding to binary spherical gradient illumination along first, second and third mutually orthogonal axes and images corresponding to complementary binary spherical gradient illumination along the first, second and third axes. The method also includes determining a specular reflectance map of the object and a diffuse reflectance map of the object based on the set of images, and/or determining a diffuse photometric normal map and a specular photometric normal map of the object based on the set of images.

20 Claims, 11 Drawing Sheets
(11 of 11 Drawing Sheet(s) Filed in Color)

(56) References Cited

OTHER PUBLICATIONS

Ma, W.-C., Hawkins, T., Peers, P., Chabert, C.-F., Weiss, M., and Debevec, P. 2007. Rapid acquisition of specular and diffuse normal maps from polarized spherical gradient illumination. In EUROGRAPHICS Symposium on Rendering. (Year: 2007).*

Oswald Aldrian and William A. P. Smith. 2011a. Inverse rendering in SUV space with a linear texture model. In Proceedings of the International Conference on Computer Vision (ICCV'11) Workshops. IEEE, 822-829. (Year: 2011).*

Huang et al., Robust Face Recognition with Structural Binary Gradient Patterns, 2017, Pattern Recognition, vol. 68, pp. 126-140.

Yang et al, Separating Specular and Diffuse Reflection Components in the HSI Color Space, 2013, IEEE International Conference on Computer Vision Workshops, pp. 891-898.

* cited by examiner (a) LED sphere (b) X  (c) X'  (d) Y  (e) Y'  (f) Z  (g) Z'

(a) u, v normals   (b) init. spec. normals   (c) corr. spec. normals (a) simulated sphere   (b) orange (a) mixed albedo  (b) mixed normals (a) synth. diff. normals  (b) synth. spec. normals (a) diff. albedo (b) spec. albedo (c) diff. normal (d) spec. normal (e) diff. albedo (f) spec. albedo (g) diff. normal (h) spec. normal (a) mixed norm.  (b) diff. norm.: $suv$  (c) diff. norm.: $R - B$

IMAGE PROCESSING FOR DIFFUSE-SPECULAR SEPARATION

FIELD

The present invention relates to processing images to obtain separate mappings of specular and diffuse reflectance of an imaged object. The present invention also relates to processing images to obtain maps of specular and diffuse photometric normals of an imaged object, which may be used for modelling the imaged object.

BACKGROUND

Acquiring realistic models of real-word subjects and/or objects, including shape and appearance has been an active area of research in graphics and vision. While passive acquisition systems under uniform illumination have been the most common for multiview acquisition of 3D geometry and albedo texture, active illumination systems have usually been the preferred choice for reflectance acquisition. Recent research in active illumination has focused on fast acquisition for live subjects while still trying to obtain much of the appearance information required for realistic rendering of the acquired data.

For facial capture of persons, the active illumination technique of polarized spherical gradient illumination has been described, see M A W.-C., HAWKINS T., PEERS P., CHABERT C.-F., WEISS M., DEBEVEC P.: Rapid acquisition of specular and diffuse normal maps from polarized spherical gradient illumination. In Proceedings of the 18th Eurographics Conference on Rendering Techniques (2007), EGSR'07, Eurographics Association, pp. 183-194 (hereinafter "MHP-07"). This technique allows acquiring reflectance information including separated diffuse and specular albedo and surface normals. This method usually requires a polarized light emitting diode (LED) sphere in which every single light has a linear polarizer mounted on it in a specific orientation. This technique has also been recently extended to a single shot method using an even more sophisticated setup involving polarized RGB lights and multiple polarized cameras, with application in dynamic facial performance capture, see FYFFE G., DEBEVEC P.: Single-shot reflectance measurement from polarized color gradient illumination. In International Conference on Computational Photography (2015) (hereinafter "FD-15").

WOODHAM R. J.: Photometric stereo: A reflectance map technique for determining surface orientation from image intensity. In Proc. SPIE's 22nd Annual Technical Symposium (1978), vol. 155 (hereinafter "Woo-78"), first introduced the technique of photometric stereo for estimating shape and reflectance (albedo) of a diffuse object using multiple (at least three) observations of the object lit with a point light source from a few independent directions. The photometric stereo approach was further extended to single shot acquisition of surface normals using RGB color-multiplexing, and this approach has been applied for dynamic acquisition, see HERNANDEZ C., VOGIATZIS G., BROSTOW G. J., STENGER B., CIPOLLA R.: Non-rigid photometric stereo with colored lights. In Proc. IEEE International Conference on Computer Vision (2007), pp. 1-8 (hereinafter "HVB-07"). See also KLAUDINY M., HILTON A., EDGE J.: High-detail 3D capture of facial performance. In International Symposium 3D Data Processing, Visualization and Transmission (3DPVT) (2010) (hereinafter KHE-10).

However, the photometric stereo approach assumes pure diffuse reflectance and usually restricts acquisition from a preferred frontal viewpoint which can see the response to all the light sources in a setup. Photometric stereo has been extended for non-Lambertian objects using example based normal inference using a known (spherical) exemplar of similar material, see GOLDMAN D. B., CURLESS B., HERTZMANN A., SEITZ S. M.: Shape and spatially-varying brdfs from photometric stereo. In ICCV (2005), pp. 341-348 (hereinafter "GCHS-05".

Mallick et al.: Beyond lambert: Reconstructing specular surfaces using color. In CVPR (2005) (hereinafter "MZKB-05"), proposed a color-space separation technique for dielectric materials that linearly transforms RGB color into a formulated suv space where s aligns with white (color of light) and u; v align with chroma. Mallick et al. employ the u; v components for improved photometric stereo discarding specularities.

Color-space analysis has also been employed by LIN S., SHUM H.-Y.: Separation of diffuse and specular reflection in color images. In Proc. of IEEE Conference on Computer Vision and Pattern Recognition (CVPR) (2001) (hereinafter "LS-01"). Lin and Shum used color-space analysis to remove specular reflectance for traditional point source photometric stereo assuming dielectric material reflectance. Their analysis is based on the observation of brighter measurements for a pixel containing some specular response compared to darker measurements which are assumed to be pure diffuse reflectance. DEBEVEC P., HAWKINS T., TCHOU C., DUIKER H.-P., SAROKIN W., SAGAR M.: Acquiring the reflectance field of a human face. In Proceedings of the 27th annual conference on Computer graphics and interactive techniques (2000), ACM Press/Addison-Wesley Publishing Co., pp. 145-156 (hereinafter "DHT-00") introduced a light stage apparatus for acquiring facial reflectance fields.

Subsequently, LED spheres have been employed for photometric stereo, see WENGER A., GARDNER A., TCHOU C., UNGER J., HAWKINS T., DEBEVEC P.: Performance relighting and reflectance transformation with time-multiplexed illumination. 756-764 (hereinafter "WGT-05"). LED spheres have also been used under a dense set of incident lighting directions for facial reflectance acquisition, see WEYRICH T., MATUSIK W., PFISTER H., BICKEL B., DONNER C., TU C., MCANDLESS J., LEE J., NGAN A., JENSEN H. W., GROSS M.: Analysis of human faces using a measurement based skin reflectance model. ACM Trans. Graph. 25, 3 (July 2006), 1013-1024 (hereinafter "WMP-06")

Ma et al. (MHP-07) described polarized spherical gradient illumination (using an LED sphere) for acquisition of the separated diffuse and specular albedos and photometric normals of a subject using eight photographs, and demonstrated rendering with the acquired data using the acquired hybrid normal maps. However, the linear polarization pattern on employed on their LED sphere restricted acquisition to a single frontal viewpoint.

GHOSH A., FYFFE G., TUNWATTANAPONG B., BUSCH J., YU X., DEBEVEC P.: Multiview face capture using polarized spherical gradient illumination. ACM Transactions on Graphics (TOG) 30, 6 (2011), 129 (hereinafter "GFT-11") extended the view-dependent solution of Ma et al. (MHP-07) for multi-view facial acquisition with polarized spherical gradient illumination. Their method switches the linear polarization state on the LED sphere (latitude vs longitude) instead of on the camera as required by Ma et al. (MHP-07), providing a symmetric solution about a y axis of the LED sphere. Additionally, Ghosh et al. (GFT-11) employed both the gradients and their complements in the multiview acquisition process for greater signal-to-noise ratio of the acquired data, as well as for assistance in optical flow based motion alignment, as proposed by Wilson et al.: Temporal upsampling of performance geometry using photometric alignment. ACM Transactions on Graphics (TOG) 29, 2 (2010), 17 (hereinafter "WGP-10").

FYFFE G., HAWKINS T., WATTS C., MA W.-C., DEBEVEC P.: Comprehensive facial performance capture. Computer Graphics Forum (Proc. Eurographics) 30, 2 (2011) (hereinafter "FHW-11") applied the complimentary spherical gradient illumination based alignment of Wilson et al. (WGP-10) in conjunction with high speed photography to acquire longer facial performance sequences. However, they acquired unpolarized spherical illumination and instead applied a heuristics based diffuse-specular separation on the acquired data to obtain separated reflectance maps for rendering.

Fyffe & Debevec (FD15) have proposed spectral multiplexing with polarized spherical gradient illumination (using an Red-Green-Blue, RGB, LED sphere) for single shot acquisition of separated diffuse and specular albedo and normals. Besides a polarized RGB LED sphere, their method requires multiple polarized cameras per viewpoint (parallel and cross-polarized) in order to obtain the desired reflectance and normal maps, which may represent a somewhat complex setup.

FYFFE G., GRAHAM P., TUNWATTANAPONG B., GHOSH A., DEBEVEC P.: Near-instant capture of high-resolution facial geometry and reflectance. Computer Graphics Forum 35, 2 (2016), 353-363. URL: http://dx.doi.org/10.1111/cgf.12837, doi:10.1111/cgf.12837 (hereinafter "FGT-16") employs single shot acquisition with twenty four cameras and six flashes in a multiview setup. In this work, a subset of cameras fire together with each flash in a sequence lasting a few milliseconds to obtain a dense set of multiview images lit with flashes from different directions. The acquired data enables reconstruction of high resolution facial geometry and estimation of diffuse and specular reflectance maps using a combination of diffuse and specular photometric stereo and inverse rendering. While this approach could be regarded as a middle ground between completely passive acquisition and multi-shot active illumination approaches, it requires more involved processing of acquired data.

Researchers have also looked at more separation of facial reflectance using a combination of polarized spherical illumination and structured lighting to estimate layered skin reflectance, see GHOSH A., HAWKINS T., PEERS P., FREDERIKSEN S., DEBEVEC P.: Practical modeling and acquisition of layered facial reflectance. ACM Trans. Graph. 27, 5 (December 2008), 139:1-139:10 (hereinafter "GHP-08"). This approach has been reduced to single-shot acquisition using polarized light field imaging, albeit with reduced spatial resolution of the acquired maps, see KIM J., IZADI S., GHOSH A.: Single-shot layered reflectance separation using a polarized light field camera. In Proceedings of the Eurographics Symposium on Rendering: Experimental Ideas & Implementations (2016), EGSR '16 (hereinafter "KIG16").

Lamond et al.: Image-based separation of diffuse and specular reflections using environmental structured illumination. In Proc. of International Conference on Computational Photography (2009) (hereinafter "LPGD-09") have proposed employing high frequency phase shifting of incident environmental illumination as a mechanism for diffuse-specular separation. They employ a reflective hemispherical dome to illuminate objects with such structured illumination. Compared to a discrete LED sphere, their setup is suitable for highly specular objects due to the continuous nature of the incident illumination.

Tunwattanapong et al.: Acquiring reflectance and shape from continuous spherical harmonic illumination. ACM Trans. Graph. (Proc. SIGGRAPH) 32, 4 (2013) (hereinafter "TFG-13]") instead employ a rotating semicircular LED arc to illuminate specular objects with continuous spherical illumination. They further illuminate objects with higher order spherical harmonics, using their setup for frequency domain diffuse-specular separation and reflectance estimation.

Researchers have also investigated various types of illumination using a liquid crystal display (LCD) panel to emit varying frequencies on planar samples. GHOSH A., CHEN T., PEERS P., WILSON C. A., DEBEVEC P. E.: Estimating specular roughness and anisotropy from second order spherical gradient illumination. Comput. Graph. Forum 28, 4 (2009), 1161-1170 (hereinafter "GCP-09") describes using second order (polarized) gradients. FRANCKEN Y., CUYPERS T., MERTENS T., BEKAERT P.: Gloss and normal map acquisition of mesostructures using gray codes. In Proceedings of the 5th International Symposium on Advances in Visual Computing: Part II (Berlin, Heidelberg, 2009), ISVC '09, Springer-Verlag, pp. 788-798 (hereinafter "FCMB-09") described using gray codes. AITTALA M., WEYRICH T., LEHTINEN J.: Practical SVBRDF capture in the frequency domain. ACM Trans. on Graphics (Proc. SIGGRAPH) 32, 4 (2013) (hereinafter "AWL-13") describes using band-limited Fourier patterns. However, given the limited coverage of LCD panel illumination and longer acquisition time due to lower light levels, these approaches are not well suited for acquisition of, for example, human subjects.

Vlasic et al.: Dynamic shape capture using multiview photometric stereo. ACM Transactions on Graphics 28, 5 (2009), 174 (hereinafter "VPB-09") proposed applying binary spherical gradient illumination for estimating surface normals for a full body performance capture application. Instead of directly estimating surface normals from the acquired data, they employed example based normal inference using a diffuse sphere due to the specific geometry of the LED sphere employed for the acquisition. Importantly, Vlasic et al. assumed diffuse reflectance and did not investigate diffuse-specular separation with the acquired data.

SUMMARY

According to a first aspect of the invention, there is provided a method of image processing, including receiving a set of images of an object, the set of images including images corresponding to binary spherical gradient illumination along first, second and third mutually orthogonal axes and images corresponding to complementary binary spherical gradient illumination along the first, second and third axes. The method also includes determining a specular reflectance map of the object and a diffuse reflectance map of the object based on the set of images.

The set of images may correspond to images obtained using a camera without a polarising filter. The binary spherical gradient illumination may be provided by polarised or unpolarised light sources. The set of images do not correspond to illumination using polarised light in combination with acquiring images through a polariser.

The method may also include receiving a viewpoint vector corresponding to a camera used to obtain the set of images. The method may also include generating a set of local images by using a rotation matrix to rotate the set of images from the first, second and third mutually orthogonal axes to a set of rotated mutually orthogonal axes defined with respect to the viewpoint vector. The method may also include determining a specular reflectance map of the object and a diffuse reflectance map of the object based on the set of local images.

The method may also include receiving multiple sets of images, each set of images corresponding to a different viewpoint vector. The method may also include for each set of images, generating a set of local images by using a rotation matrix to rotate the set of images from the first, second and third mutually orthogonal axes to a set of rotated mutually orthogonal axes defined with respect to the respective viewpoint vector, and determining a specular reflectance map of the object and a diffuse reflectance map of the object based on the set of local images The set of images may include six images obtained using white light illumination. The set of images may include a first image of the object illuminated using binary spherical gradient illumination along the first axis. The set of images may include a second image of the object illuminated using the complement of the binary spherical gradient illumination along the first axis. The set of images may include a third image of the object illuminated using binary spherical gradient illumination along the second axis. The set of images may include a fourth image of the object illuminated using the complement of the binary spherical gradient illumination along the second axis. The set of images may include a fifth image of the object illuminated using binary spherical gradient illumination along the third axis. The set of images may include a sixth image of the object illuminated using the complement of the binary spherical gradient illumination along the third axis.

The method may also include obtaining the first to sixth images. Corresponding pixels of the first to sixth images may correspond to the same portion of the object. Corresponding pixels of the first to sixth images may correspond to approximately the same portion of the object.

Determining a specular reflectance map of the object and a diffuse reflectance map of the object based on the set of images comprises, for each pixel, determining a first estimate of specular reflectance based on a difference in color saturation between the first and second images, determining a second estimate of specular reflectance based on a difference in color saturation between the third and fourth images, determining a third estimate of specular reflectance based on a difference in color saturation between the fifth and sixth images, and determining a specular reflectance for the pixel based on the first, second and third estimates.

The specular reflectance for each pixel may be set equal to a median of the first, second and third estimates. The specular reflectance for each pixel may be set equal to a mean of the first, second and third estimates. The specular reflectance for each pixel may be set equal to a weighted mean of the first, second and third estimates.

The diffuse reflection map may be obtained by subtracting the specular reflectance map from a mixed reflectance map. The mixed reflectance map may be obtained by summing the first and second images. The mixed reflectance map may be obtained by summing the third and fourth images. The mixed reflectance map may be obtained by summing the fifth and sixth images. The mixed reflectance map may be obtained by acquiring an additional image under uniform illumination.

The first to sixth images may include data corresponding to two or more color channels. Determining a specular reflectance map of the object and a diffuse reflectance map of the object based on the set of images may include, for each pixel, determining an estimate of a diffuse normal. Determining a specular reflectance map of the object and a diffuse reflectance map of the object based on the set of images may include, for each pixel, and for one or more color channels of the two or more color channels, determining a first estimated diffuse reflectance value and a first estimated specular reflectance value by solving a linear system of equations relating the pixel values of the first and second images and a component of the estimated diffuse normal parallel to the first axis, determining a second estimated diffuse reflectance value and a second estimated specular reflectance value by solving a linear system of equations relating the pixel values of the third and fourth images and a component of the estimated diffuse normal parallel to the second axis, and determining a third estimated diffuse reflectance value and a third estimated specular reflectance value by solving a linear system of equations relating the pixel values of the fifth and sixth images and a component of the estimated diffuse normal parallel to the third axis. Determining a specular reflectance map of the object and a diffuse reflectance map of the object based on the set of images may include, for each pixel, determining the specular reflectance based on the first, second and third estimated specular reflectance values for the one or more color channels. Determining a specular reflectance map of the object and a diffuse reflectance map of the object based on the set of images may include determining the diffuse reflection map by subtracting the specular reflectance map from a mixed reflectance map.

The specular reflectance for each pixel may be set equal to a mean, a weighted mean, or a median of the first, second and third estimated specular reflectance values. When estimated specular reflectance values are determined for two or more color channels, the values corresponding to the two or more color channels may be averaged using a mean, a weighted mean or a median.

The mixed reflectance map may be obtained by summing the first and second images. The mixed reflectance map may be obtained by summing the third and fourth images. The mixed reflectance map may be obtained by summing the fifth and sixth images. The mixed reflectance map may be obtained by acquiring an additional image under uniform illumination.

The set of images may include a seventh image of the object illuminated along the first axis using either a first binary spherical gradient illumination or its complement, encoded in a first color channel, the object also illuminated along the second axis using either a second binary spherical gradient illumination or its complement, encoded in a second color channel, and the object also illuminated along the third axis using either a third binary spherical gradient illumination or its complement, encoded in a third color channel. The set of images may include an eighth image of the object illuminated along the first axis using the other of the first binary spherical gradient illumination and its complement, encoded in the first color channel, illuminated along the second axis using the other of the second binary spherical gradient illumination and its complement, encoded in the second color channel, and illuminated along the third axis using the other of the third binary spherical gradient illumination and its complement, encoded in the third color channel.

The method may also include acquiring the seventh and eight images. The first, second and third color channels may be red, green and blue channels respectively.

Corresponding pixels of the seventh and eight images may correspond to the same portion of the object. Corresponding pixels of the seventh and eight images may correspond to approximately the same portion of the object.

Determining a specular reflectance map of the object and a diffuse reflectance map of the object based on the set of images comprises, for each pixel, determining an estimate of a diffuse photometric normal. Determining a specular reflectance map of the object and a diffuse reflectance map of the object based on the set of images comprises, for each pixel, determining a first estimated diffuse reflectance value and a first estimated specular reflectance value by solving a linear system of equations relating the pixel values of the seventh and eighth images for the first color channel and a corresponding component of the estimated diffuse photometric normal parallel to the first axis, determining a second estimated diffuse reflectance value and a second estimated specular reflectance value by solving a linear system of equations relating the pixel values of the seventh and eighth images for the second color channel and a corresponding component of the estimated diffuse photometric normal parallel to the second axis, and determining a third estimated diffuse reflectance value and a third estimated specular reflectance value by solving a linear system of equations relating the pixel values of the seventh and eighth images for the third color channel and a corresponding component of the estimated diffuse photometric normal parallel to the third axis. Determining a specular reflectance map of the object and a diffuse reflectance map of the object based on the set of images comprises, for each pixel, determining the specular reflectance based on the first, second and third estimated specular reflectance values, and determining the diffuse reflection map by subtracting the specular reflectance map from a mixed reflectance map.

Determining the specular reflectance based on the first, second and third estimated specular reflectance values may include calculating a mean, a weighted mean or a median of the first, second and third estimated specular reflectance values.

The mixed reflectance map may be obtained by summing the first and second images. The mixed reflectance map may be obtained by summing the third and fourth images. The mixed reflectance map may be obtained by summing the fifth and sixth images. The mixed reflectance map may be obtained by acquiring an additional image under uniform illumination.

The method may also include determining a diffuse photometric normal map and a specular photometric normal map of the object based on the set of images.

The first aspect of the invention may include features and/or functions corresponding to any compatible features and/or functions of the hereinafter described second aspect of the invention. In particular, determining a diffuse photometric normal map and a specular photometric normal map of the object based on the set of images may be carried out according to any compatible features of the hereinafter described second aspect of the invention.

The method of image processing according to the first aspect may be carried out using one or more physical, digital electronic processors.

According to a second aspect of the invention, there is provided a method of image processing including receiving a set of images of an object, the set of images including images corresponding to binary spherical gradient illumination along first, second and third mutually orthogonal axes and images corresponding to complementary binary spherical gradient illumination along the first, second and third axes. The method also includes determining a diffuse photometric normal map and a specular photometric normal map of the object based on the set of images.

The second aspect of the invention may include features and/or functions corresponding to any compatible features and/or functions of the first aspect of the invention.

Determining a diffuse photometric normal map and a specular photometric normal map of the object based on the set of images may include determining a mixed photometric normal map, determining the diffuse photometric normal map, and determining the specular photometric normal map based on subtracting the diffuse photometric normal map from the mixed photometric normal map.

The set of images may correspond to images obtained using a camera without a polarising filter. The binary spherical gradient illumination may be provided by polarised or unpolarised light sources. The set of images do not correspond to illumination using polarised light in combination with acquiring images through a polariser.

The method may also include receiving a viewpoint vector corresponding to a camera used to obtain the set of images. The method may also include generating a set of local images by using a rotation vector to rotate the set of images from the first, second and third mutually orthogonal axes to a set of rotated mutually orthogonal axes defined with respect to the viewpoint vector. The method may also include determining a diffuse photometric normal map and a specular photometric normal map of the object based on the set of local images.

The method may also include receiving multiple sets of images, each set of images corresponding to different viewpoint vector. The method may also include, for each set of images, generating a set of local images by using a rotation vector to rotate the set of images from the first, second and third mutually orthogonal axes to a set of rotated mutually orthogonal axes defined with respect to the respective viewpoint vector, and determining a diffuse photometric normal map and a specular photometric normal map of the object based on the set of local images.

The set of images may include six images obtained using white light illumination. The set of images may include a first image of the object illuminated using binary spherical gradient illumination along the first axis. The set of images may include a second image of the object illuminated using the complement of the binary spherical gradient illumination along the first axis. The set of images may include a third image of the object illuminated using binary spherical gradient illumination along the second axis. The set of images may include a fourth image of the object illuminated using the complement of the binary spherical gradient illumination along the second axis. The set of images may include a fifth image of the object illuminated using binary spherical gradient illumination along the third axis. The set of images may include a sixth image of the object illuminated using the complement of the binary spherical gradient illumination along the third axis.

The method may also include obtaining the first to sixth images. Corresponding pixels of the first to sixth images may correspond to the same portion of the object. Corresponding pixels of the first to sixth images may correspond to approximately the same portion of the object.

Determining a diffuse normal map and a specular normal map of the object based on the set of images may include determining a mixed photometric normal map. Determining a diffuse normal map and a specular normal map of the object based on the set of images may include determining the diffuse photometric normal map. Determining a diffuse normal map and a specular normal map of the object based on the set of images may include, for each pixel, determining the specular photometric normal based on modelling the mixed photometric normal as a weighted sum of the determined diffuse photometric normal and an unknown specular photometric normal, and solving for the specular photometric normal.

Determining the diffuse photometric normal map may include transforming the first to sixth images into an suv color space. Determining the diffuse photometric normal map may include, for each pixel, determining the diffuse photometric normal based on the u and v values of the first to sixth images in suv color space.

The first axis component of the diffuse photometric normal may be determined based on a difference between the quantity $(u^2+v^2)^{0.5}$ for the pixel in the first and second images. The second axis component of the diffuse photometric normal may be determined based on a difference between the quantity $(u^2+v^2)^{0.5}$ for the pixel in the third and fourth images. The third axis components of the diffuse photometric normal may be determined based on a difference between the quantity $(u^2+v^2)^{0.5}$ for the pixel in the fifth and sixth images.

The first to sixth images may include data corresponding to two or more color channels. Determining the diffuse photometric normal map may include, for each pixel, determining the diffuse photometric normal based on the values of the first to sixth images corresponding to a brightest color channel and a darkest color channel.

The brightest color channel may correspond to a color channel of the two or more color channels in which the imaged object has the largest reflectance. The darkest color channel may correspond to a color channel of the two or more color channels in which the imaged object has the smallest reflectance.

The first axis component of the diffuse photometric normal may be determined based on a difference between the pixel value of the brightest color channel in the first image and the pixel value of the darkest color channel in the second image. The second axis component of the diffuse photometric normal may be determined based on a difference between the pixel value of the brightest color channel in the third image and the pixel value of the darkest color channel in the fourth image. The third axis component of the diffuse photometric normal may be determined based on a difference between the pixel value of the brightest color channel in the fifth image and the pixel value of the darkest color channel in the sixth image.

The two or more color channels may include, or consist of, red, green and blue. The brightest color channel may correspond to red. The darkest color channel may correspond to blue. For dielectric materials such as human skin, the brightest color channel may correspond to red and the darkest color channel may correspond to blue.

Determining the diffuse photometric normal map may include blurring the mixed photometric normal map. Blurring the mixed photometric normal map may include applying a low pass spatial filter to the mixed photometric normal map.

Determining the diffuse photometric normal map may include for each pixel, and for each of one or more color channels, determining a component of a diffuse photometric normal parallel to the first axis based on the darkest pixel value of the first and second images for that color channel. Determining the diffuse photometric normal map may include for each pixel, and for each of one or more color channels, determining a component of a diffuse photometric normal parallel to the second axis based on the darkest pixel value of the third and fourth images for that color channel. Determining the diffuse photometric normal map may include for each pixel, and for one or more color channels, determining a component of a diffuse photometric normal parallel to the third axis based on the darkest pixel value of the fifth and sixth images for that color channel.

The set of images may include a seventh image of the object illuminated along the first axis using either a first binary spherical gradient illumination or its complement, encoded in a first color channel, illuminated along the second axis using either a second binary spherical gradient illumination or its complement, encoded in a second color channel, and illuminated along the third axis using either a third binary spherical gradient illumination or its complement, encoded in a third color channel. The set of images may include an eighth image of the object illuminated along the first axis using the other of the first binary spherical gradient illumination and its complement, encoded in the first color channel, illuminated along the second axis using the other of the second binary spherical gradient illumination and its complement, encoded in the second color channel, and illuminated along the third axis using the other of the third binary spherical gradient illumination and its complement, encoded in the third color channel.

The method may also include acquiring the seventh and eight images. Corresponding pixels of the seventh and eight images may correspond to the same portion of the object. Corresponding pixels of the seventh and eight images may correspond to approximately the same portion of the object.

Determining a diffuse photometric normal map and a specular photometric normal map of the object based on the set of images may include determining a mixed photometric normal map, determining the diffuse photometric normal map, and determining the specular photometric map based on subtracting the diffuse photometric normal map from the mixed photometric normal map. Determining the diffuse photometric normal map may include blurring the mixed photometric normal map. Blurring the mixed photometric normal map may include applying a low pass spatial filter to the mixed photometric normal map.

Determining a diffuse normal map and a specular normal map of the object based on the set of images may include determining a mixed photometric normal map. Determining a diffuse normal map and a specular normal map of the object based on the set of images may include, for each pixel, determining a component of a diffuse photometric normal parallel to the first axis based on the darkest pixel value of the seventh and eighth images in the first color channel, determining a component of a diffuse photometric normal parallel to the second axis based on the darkest pixel value of the seventh and eighth images in the second color channel, and determining a component of a diffuse photometric normal parallel to the third axis based on the darkest pixel value of the seventh and eighth images in the third color channel. Determining a diffuse normal map and a specular normal map of the object based on the set of images may include determining the specular photometric normal map based on subtracting the diffuse photometric map from the mixed photometric map.

The method may also include determining a specular reflectance map of the object and a diffuse reflectance map of the object based on the set of images.

The method of image processing according to the second aspect may be carried out using one or more physical, digital electronic processors.

According to a third aspect of the invention, there is provided a method including illuminating an object along the first axis using either a first binary spherical gradient illumination or its complement, encoded in a first color channel, along the second axis using either a second binary spherical gradient illumination or its complement, encoded in a second color channel, and along the third axis using either a third binary spherical gradient illumination or its complement, encoded in a third color channel. The method also includes acquiring a first image of the object using an image capturing device. The method also includes illuminating the object along the first axis using the other of the first binary spherical gradient illumination and its complement, encoded in the first color channel, along the second axis using the other of the second binary spherical gradient illumination and its complement, encoded in the second color channel, and along the third axis using the other of the third binary spherical gradient illumination and its complement, encoded in the third color channel. The method also includes acquiring a second image of the object using the image capturing device.

The acquired images may be processed according the first aspect of the invention and/or the second aspect of the invention.

According to a fourth aspect of the invention, there is provided a non-transitory computer readable medium storing a computer program, the computer program configured such that when executed by one or more physical, digital electronic processors, the one or more physical, digital electronic processors are caused to execute the method of the first aspect.

According to a fifth aspect of the invention, there is provided a non-transitory computer readable medium storing a computer program, the computer program configured such that when executed by one or more physical, digital electronic processors, the one or more physical, digital electronic processors are caused to execute the method of the second aspect.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Certain embodiments of the present invention will now be described, by way of example, with reference to the accompanying drawings, in which.

DETAILED DESCRIPTION OF CERTAIN EMBODIMENTS

Figure 1:
FIGS. 1(a) to 1(f) present photographs obtained using white light binary spherical gradients and their complements.
FIGS. 1(g) to 1(j) respectively present diffuse albedo, specular albedo, diffuse photometric normals and specular photometric normals.
FIG. 1(k) presents a computer graphics rendering generated using the data shown in FIGS. 1(g) to 1(j)

In the following, like parts are denoted by like reference numerals.

The inventors have developed a novel variant active illumination method for acquiring separated diffuse and specular reflectance, and additionally separated diffuse and specular photometric normals, using binary spherical gradient illumination. Similar to previous work (see "Background" section), the present specification relates to using an LED sphere to illuminate an object, for example a person, with binary spherical gradients and their complements. However, unlike previous work, the present specification employs unpolarized illumination and unpolarized imaging. Instead, in the present specification, an inherent property of the binary spherical gradients is recognized and utilised to enable diffuse-specular separation of acquired albedo and photometric normals.

In this respect, the methods of the present specification may use a simpler setup (compared to previous work), which does not require polarizing multiple (usually hundreds of) light sources, or any polarizers in the optical path of the sensor. The methods of the present specification may also require fewer photographs. Advantageously, the methods of the present specification do not impose any restrictions on the acquisition viewpoint for diffuse-specular separation.

Referring to FIG. 1, panels (a) to (f) show acquired images of a face lit with binary spherical gradient illumination and their complements. Panels (g) and (h) show estimated diffuse and specular albedo obtained according to methods of the present specification. Panels (i) and (j) show diffuse and specular photometric normal maps obtained from the acquired data using methods according to the present specification. The obtained normal maps and albedo data enables realistic relighting with hybrid normal rendering, as shown in panel (k). Details of how to obtain images as shown in FIG. 1 shall be apparent from the description hereinafter.

In addition to achieving albedo separation using a novel color-space analysis on the binary spherical gradients, the present specification also demonstrates separation of photometric normals including robust estimation of a specular normal map from the acquired data (as shown in FIG. 1) and estimation of a pure diffuse normal map. This result of the methods according to the present specification is somewhat surprising given the binary nature of the incident illumination for specular reflectance.

This specification also concerns methods for using spectral multiplexing in conjunction with binary spherical gradient illumination to enable a very efficient two-shot acquisition approach, with potential applications in, for example, dynamic capture applications.

Although the unpolarized binary spherical gradient illumination employed is similar to Vlasic et al. (VPB-09), the present specification goes beyond the disclosure of Vlasic et al. (VPB-09) by describing diffuse-specular separation of albedo and surface normals suitable for dielectric materials such as skin.

Image Acquisition

In the following description, examples will be illustrated using images obtained using an LED sphere including 168 white LED lamps (ColorKinetics iW MR gen3) mounted on a 2.5 m diameter spherical structure. In general, any light sources that allow simple binary on-off control can be employed with the methods of the present specification, because the binary spherical gradients used do not require control of grey-level intensity of light emission.

Figure 2:
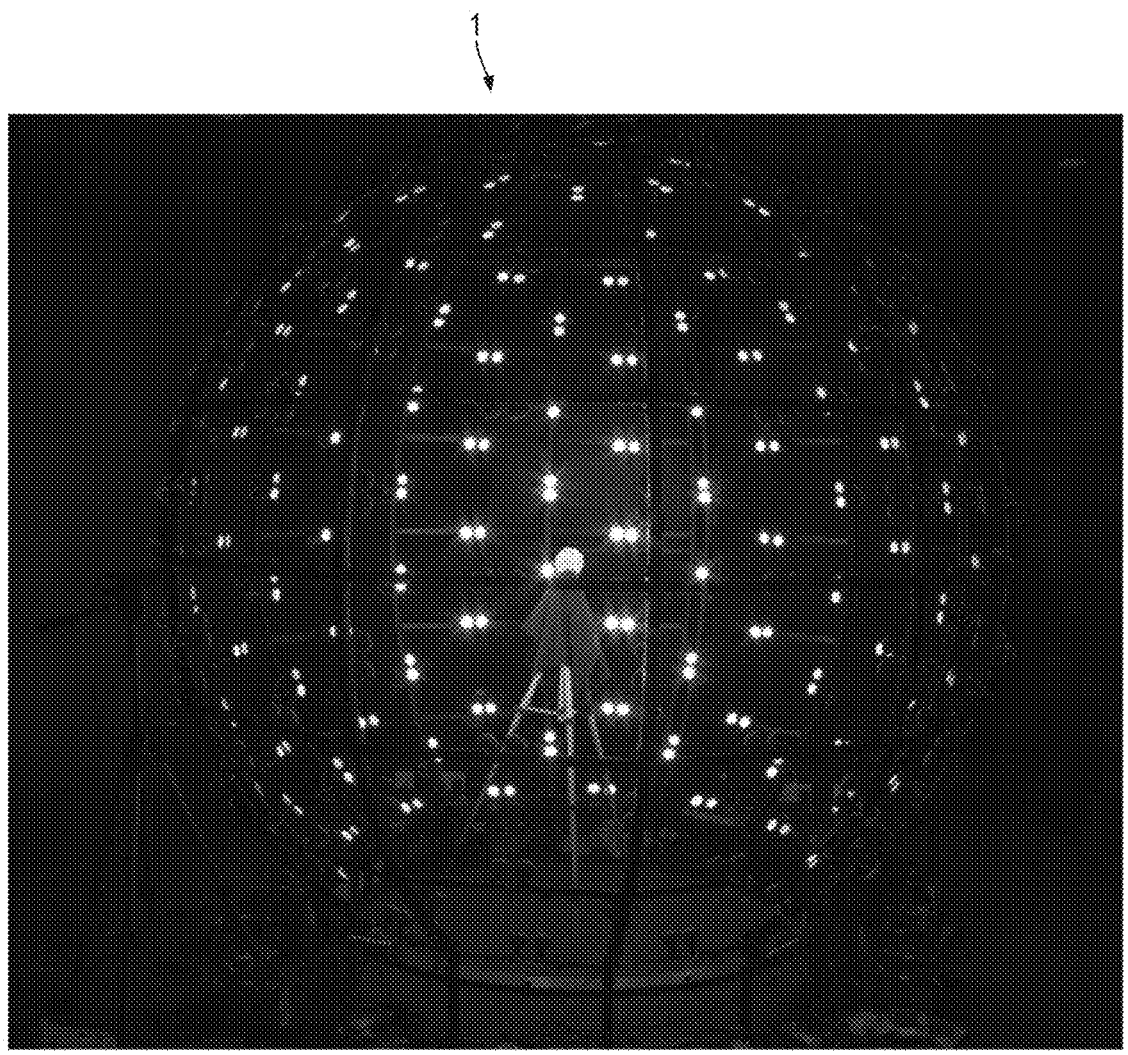
FIG. 2 illustrates an LED sphere used to provide white light binary spherical gradients and their complements.
Figure 2:
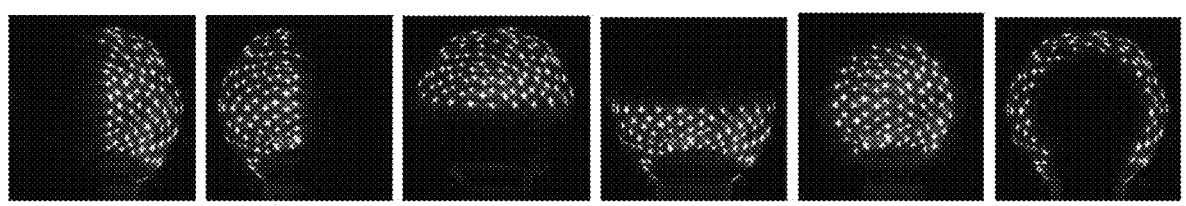

Referring also to FIG. 2, panel (a) shows an acquisition setup consisting of an LED sphere 1. Panels (b) through (g) respectively show binary spherical gradient illumination conditions termed X, X*, Y, Y*, Z and Z* as imaged on a mirror ball.

The lamps are mounted on the LED sphere 1 structure along longitudes and latitudes. This arrangement helps to simplify partitioning of the lights for each of the binary spherical gradient illumination conditions X, Y, Z and complements X*, Y*, Z*. Exactly half of the lights, 84 in this example, are used for each lighting condition X, Y, Z, X*, Y*, Z*. Partitioning along two orthogonal longitudes is used for the X and Z binary spherical gradients and their complements X*, Z*, and partition along the equatorial latitude is used for the Y binary spherical gradient and its complement Y.

The binary spherical gradient illumination conditions X, Y, Z and the complements X', Y', Z* may be further explained with reference to a system of spherical polar coordinates (r, θ, φ). On an illumination sphere with constant radius r (in the example r=2.5 m), the binary spherical gradient X along a first, x-axis may correspond to illumination of the LEDs within the region of the LED sphere 1 defined by the coordinate ranges $0 \leq \theta \leq \pi$ and $0 \leq \varphi < \pi$. Similarly, the complement X* along the first, x-axis may correspond to illumination of the LEDs within the region of the LED sphere 1 defined by the coordinate ranges $0 \leq \theta \leq \pi$ and $\pi \leq \varphi < 2\pi$.

The binary spherical gradient Y illumination along a second, y-axis may correspond to illumination of the LEDs within the region of the LED sphere 1 defined by the coordinate ranges $0 \leq \theta < \pi/2$ and $0 \leq \varphi < 2\pi$. The complement Y* along the second, y-axis may correspond to illumination of the LEDs within the region of the LED sphere 1 defined by the coordinate ranges $\pi/2 \leq \theta \leq \pi$ and $0 \leq \varphi < 2\pi$. The reference to x- and y-axes is relative to x- and y-axes of an image acquired looking towards the coordinate system origin along the direction $\theta = \pi/2$, $\varphi = 0$.

The binary spherical gradient Z illumination along a third, z-axis may correspond to of the LEDs within the region of the LED sphere 1 defined by the coordinate ranges $0 \leq \theta \leq \pi$, $0 \leq \varphi < \pi/2$, and $3\pi/2 \leq \varphi < 2\pi$ of the illumination sphere (equivalently $0 \leq \theta \leq \pi$, and $-\pi/2 \leq \varphi < \pi/2$ if φ is defined on $-\pi \leq \varphi < \pi$). The complement Z* along the third, z-axis may correspond to illumination of the LEDs within the region of the LED sphere 1 defined by the coordinate ranges $0 \leq \theta \leq \pi$, and $\pi/2 \leq \varphi < 3\pi/2$ of the illumination. The reference to the z-axis is relative to distance towards/away from a viewpoint for an image acquired looking towards the coordinate system origin along the direction $\theta = \pi/2$, $\varphi = 0$.

In a first set of methods according to the present specification, six images of an object or subject are rapidly acquired, one under each of the binary spherical gradients X, Y, Z and the complements X*, Y*, Z*. The images were acquired using a consumer DSLR camera (Canon EOS 750D with a 18-135 mm lens) operating in burst mode. This camera was used to obtain the exemplary images shown in the figures. However, any suitable digital camera or equivalent image capturing apparatus may be used to obtain the images. Burst mode acquisition is not essential. Provided that the object being imaged is not moving, a delay between acquiring images may be seconds, minutes or longer.

The LED sphere 1 includes an additional set of 168 RGB LED lamps (ColorKinetics iColor MR gen3), which are mounted adjacent to the white LED lamps. In a second set of methods according to the present specification, the RGB LED lamps may be used for spectral multiplexing of the binary spherical gradients X, Y, Z and the complements X*, Y*, Z* to enable a two-image acquisition of sufficient information to permit albedo separation and also calculation of diffuse and specular normals.

Although examples described in this specification relate to images obtained using the hereinbefore described LED sphere 1, the methods of the present specification are equally applicable to binary spherical gradient images obtained using a LED sphere of arbitrary configuration. In particular, the precise number and distribution of LEDs is not important, provided that the binary spherical gradients X, Y, Z and complements X*, Y*, Z* may be provided.

Although the examples described in this specification relate to images obtained using an LED sphere 1 including multiple, discrete LED lamps, the methods of the present specification are equally applicable to any other type of illumination arrangement which is capable of providing the binary spherical gradients X, Y, Z and complements X*, Y*, Z*. A continuous illumination sphere capable of generating the binary spherical gradients X, Y, Z and complements X*, Y*, Z* would be suitable for use with the methods of the present specification.

Although the binary spherical gradients X, Y, Z and complements X*, Y*, Z* have been described in relation to a particular coordinate system, this is non-limiting and purely in the interests of clarity of the explanations hereinafter. The binary spherical gradients X, Y, Z and complements X*, Y*, Z* may be expressed in any suitable coordinate system(s).

Although we refer to binary spherical gradients X, Y, Z and complements X*, Y*, Z*, the illumination conditions X*, Y*, Z* are also binary spherical gradients, to which the illumination conditions X, Y, Z are complementary.

First Method of Albedo Separation

First to sixth images of an object or subject (e.g. a person) are acquired corresponding to the binary spherical gradients X, Y, Z and the complements X*, Y*, Z*. Separation of albedo (reflectance) under uniform illumination into diffuse and specular reflectance may be formulated according to a first method according to the present specification.

A first image $I_X$ corresponds to the binary spherical gradient X along the first, x-axis. If the first image $I_X$ is an N by M image, then an individual pixel of the first image $I_X$ may be denoted by $I_X(n,m)$, with n a first index $1 \leq n \leq N$ and m a second index $1 \leq n \leq M$. In general, a pixel may include red, R, green, G and blue, B values, which may be denoted for the first image as $R_X(n,m)$, $G_X(n,m)$ and $B_X(n,m)$ respectively.

Similarly, a second image $I_{X*}$ corresponding to the complement X* may have pixel values denoted as $I_{X*}(n,m)$ or for the RGB components, $R_{X*}(n,m)$, $G_{X*}(n,m)$ and $B_{X*}(n,m)$. A third image $I_Y$ corresponding to the binary spherical gradient Y may have pixel values denoted as $I_Y(n,m)$, or for the RGB components, $R_Y(n,m)$, $G_Y(n,m)$ and $B_Y(n,m)$. A fourth image $I_{Y*}$ corresponding to the complement Y* may have pixel values denoted as $I_Z(n,m)$ or for the RGB components, $R_{Y*}(n,m)$, $G_{Y*}(n,m)$ and $B_{Y*}(n,m)$. A fifth image $I_Z$ corresponding to the binary spherical gradient Z may have pixel values denoted as $I_Z(n,m)$, or for the RGB components, $R_{Z*}(n,m)$, $G_{Z*}(n,m)$ and $B_{Z*}(n,m)$. A sixth image $I_{Z*}$ corresponding to the complement Z* may have pixel values denoted as $I_{Z*}(n,m)$ or for the RGB components, $R_{Z*}(n,m)$, $G_{Z*}(n,m)$ and $B_{Z*}(n,m)$.

It should be noted that due to the nature of the binary spherical gradient X, Y, Z and complement X', Y', Z' lighting conditions, the sum of images corresponding to any two complementary lighting conditions is equivalent to an image $I_U$ obtained using a uniform illumination condition in which all LEDs of the LED sphere 1 are turned on. Any one on of the combinations $I_U=I_X+I_{X*}$, $I_U=I_Y+I_{Y*}$, or $I_U=I_Z+I_{Z*}$ may provide a resulting image $I_U$ corresponding to uniform illumination. Unless otherwise stated, operations indicated to be performed on images should be presumed to be carried out pixelwise, i.e. $I_X+I_{X*}$ corresponds to calculating $I_U(n,m) = I_X(n,m)+I_{X*}(n,m)$ for each combination of n and m. A uniform image $I_U$ may provide an estimate of the mixed albedo containing both the diffuse reflectance $\rho_d$ and the specular reflectance $\rho_s$.

The first method is based, at least in part, on the inventor's observation that using illumination according to the binary spherical gradients X, Y, Z and complements X*, Y*, Z*, a surface on a convex dielectric object exhibits pure diffuse reflectance when lit with the dark (off) hemisphere, while exhibiting both diffuse and specular reflectance when lit with the bright (on) hemisphere of the binary spherical gradients X, Y, Z and complements X*, Y*, Z*.

Without wishing to be bound by theory, this is believed to be due to the wide hemispherical integration lobe of diffuse reflectance (centered around the surface normal) which continues to integrate some light from the bright hemisphere of a binary spherical gradient X, Y, Z or complement X*, Y*, Z* even when a surface faces away towards the dark hemisphere, while receiving no light only when facing exactly in the direction of the dark side. On the other hand, typical specular reflectance on a dielectric object is believed to have a much narrower lobe of reflection (centered around the reflection vector) which integrates light only when facing the bright side of a binary spherical gradient X, Y, Z or complement X*, Y*, Z*.

This key observation is utilised herein to formulate a color-space separation for the albedo of an imaged object or subject under uniform illumination. In particular, for colored dielectric materials, specular reflectance $\rho_s$ is white in color when a surface is lit with white light. Consequently, when a colored dielectric surface (of an imaged object or subject) is lit with a binary spherical gradient X, Y, Z and its complement X*, Y*, Z* the reflected RGB color of that surface is more saturated in the darker (pure diffuse) lighting condition while exhibiting reduced saturation under the brighter (diffuse plus specular) lighting condition due to mixing with some white reflection. As an example, a point on an object surface facing towards to the illuminated half in the binary spherical gradient X will be relatively more saturated in color (although darker) when not directly illuminated under the complement X.

The RGB color values of the first to sixth images $I_X$, $I_{X*}$, $I_Y$, $I_{Y*}$, $I_Z$, $I_{Z*}$ are converted into HSV space (representing Hue, Saturation, and Value: although the following color-space analysis also holds for other similar color-spaces such as HSI or HSL). For example, for the first, x-axis, the RGB values of the binary spherical gradient X image $I_X=\{R_X(n,m), G_X(n,m), B_X(n,m)\}$ are converted into equivalent HSV values $H_X(n,m)$, $S_X(n,m)$, $V_X(n,m)$, and the RGB values of the complement X* image $I_{X*}=\{R_{X*}(n,m), G_{X*}(n,m), B_{X*}(n,m)\}$ are converted into equivalent HSV values $H_{X*}(n,m)$, $S_{X*}(n,m)$, $V_{X*}(n,m)$.

Considering a generic pixel n, m corresponding to an imaged object in relation to a binary spherical gradient and complement, for example the binary spherical gradient X and complement X. In one of the corresponding images $I_X$, $I_{X*}$ the pixel n, m will face the illuminated half of the LED sphere 1, whilst in the other of the images $I_X$, $I_{X*}$ the pixel n, m will not be directly illuminated. In other words, every pixel n, m is a light pixel $I_L=(H_L, S_L, V_L)$ in one of the images $I_X$, $I_{X*}$ and a dark pixel $I_D=(H_D, S_D, V_D)$ in the other image $I_X$, $I_{X*}$.

As an example, if $S_X(n,m)<S_{X*}(n,m)$ then $I_L=I_X$ and $I_D=I_{X*}$, in other words the pixel of the pair having the lower saturation is the brighter, light pixel $I_L$. Conversely, if $S_X(n,m)>S_{X*}(n,m)$ then $I_L=I_{X*}$ and $I_D=I_X$. Although explained in relation to the first binary spherical gradient X and first complement X*, the pairing of the second binary spherical gradient Y and second complement Y* or the pair of the third binary spherical gradient Z and third complement Z* may be treated in the same way.

As discussed hereinbefore, the inventors have appreciated that the dark pixel $(H_D, S_D, V_D)$ represents only diffuse reflectance $\rho_d$, whilst the light pixel $I_L=(H_L, S_L, V_L)$ includes a mixture of diffuse reflectance $\rho_d$ and specular reflectance $\rho_s$. Thus, the amount of specular reflectance $\rho_s(n,m)$ for the pixel may be approximated as the difference $\delta$ which needs to be subtracted from the light pixel $I_L=(H_L, S_L, V_L)$ such that its new saturation $S'_L$ equals the saturation $S_D$ of the dark pixel $I_D=(H_D, S_D, V_D)$. This can be expressed as:

$$S_D = S'_L = \frac{C_L}{V_L - \delta} \quad (1)$$

In which $C_L$ is the chroma (related to hue $H_L$) of the brighter, light pixel $I_L=(H_L, S_L, V_L)$. This leads to a closed-form solution for δ (Equation 2) which can be easily computed for every surface point imaged under a binary spherical gradient X, Y, Z and its complement X*, Y*, Z* and corresponding to a pixel position n, m.

$$\delta = V_L - \frac{C_L}{S_D} \qquad (2)$$

As the first to sixth images $I_X$, $I_{X*}$, $I_Y$, $I_{Y*}$, $I_Z$, $I_{Z*}$ corresponding to three pairings of binary spherical gradient and complement X, X*, Y, Y*, Z, Z*, three separate estimates $\delta_X$, $\delta_Y$, $\delta_Z$ may be obtained for each pixel n, m:

$$\delta_X(n,m) = \begin{cases} V_X(n,m) - \frac{C_X(n,m)}{S_{X*}(n,m)} & \text{if } S_X(n,m) \leq S_{X*}(n,m) \\ V_{X*}(n,m) - \frac{C_{X*}(n,m)}{S_X(n,m)} & \text{if } S_X(n,m) > S_{X*}(n,m) \end{cases} \qquad (3)$$

an equivalent expression may be written for the second binary spherical gradient Y and complement Y* pair:

$$\delta_Y(n,m) = \begin{cases} V_Y(n,m) - \frac{C_Y(n,m)}{S_{Y*}(n,m)} & \text{if } S_Y(n,m) \leq S_{Y*}(n,m) \\ V_{Y*}(n,m) - \frac{C_{Y*}(n,m)}{S_Y(n,m)} & \text{if } S_Y(n,m) > S_{Y*}(n,m) \end{cases} \qquad (4)$$

and for the third binary spherical gradient Z and complement Z* pair:

$$\delta_Z(n,m) = \begin{cases} V_Z(n,m) - \frac{C_Z(n,m)}{S_{Z*}(n,m)} & \text{if } S_Z(n,m) \leq S_{Z*}(n,m) \\ V_{Z*}(n,m) - \frac{C_{Z*}(n,m)}{S_Z(n,m)} & \text{if } S_Z(n,m) > S_{Z*}(n,m) \end{cases} \qquad (5)$$

In this way, according to the first method of albedo separation, three separate estimates $\delta_X$, $\delta_Y$, $\delta_Z$ may be obtained for each pixel n, m. These three separate estimates are useful to have because each estimate on its own exhibits a region of uncertainty at the boundary (terminator) between directly and indirectly illuminated portions of the object surface. In this region, the classification of a pixel n, m may become harder and the estimated differences $\delta_X$, $\delta_Y$, $\delta_Z$ relatively small, which may cause the estimates $\delta_X$, $\delta_Y$, $\delta_Z$ to become relatively more noisy and less precise. However, using three pairings of binary spherical gradient and complement X, X*, Y, Y*, Z, Z*, the regions of uncertainty occur in different regions over a sphere for each of the pairings.

According to the first method, for each pixel n, m the specular reflectance $\rho_s(n,m)$ is estimated to be the median of the three estimates $\delta_X(n,m)$, $S_Y(n,m)$, $S_Z(n,m)$. In this way, a robust output estimate of specular reflectance $\rho_S(n,m)$ may be obtained. In other examples, a mean, or weighted mean, of the three estimates $\delta_X(n,m)$, $\delta_Y(n,m)$, $\delta_Z(n,m)$ may be used to provide the value of the specular reflectance $\rho_S(n,m)$.

In some sets of images, the estimate from one of the pairings of binary spherical gradient and complement X, X*, Y, Y*, Z, Z* can be unstable when one of the measurements is too dark. Such outliers may simply be ignored, for example by taking the median of the three estimates $\delta_X(n,m)$, $\delta_Y(n,m)$, $\delta_Z(n,m)$ as the specular reflectance $\rho_s$.

Given that the illuminated, bright side of a binary spherical gradient X, Y, Z or complement X*, Y*, Z* is lit with uniform constant illumination from the LED sphere 1 (or equivalent illumination arrangement), the separated specular reflectance $\delta_X(n,m)$, $\delta_Y(n,m)$, $\delta_Z(n,m)$ is proportional to the specular albedo $\rho_s(n,m)$, modulated by Fresnel gain at grazing viewing angles. An estimate of the separated diffuse albedo $\rho_d$ may be obtained by subtract the estimated specular reflectance $\rho_s(n,m)$ from the mixed albedo $I_U$ corresponding uniform illumination and obtained from the sum of a binary spherical gradient image $I_X$, $I_Y$, $I_Z$ and its corresponding complement $I_{X*}$, $I_{Y*}$, $I_{Z*}$.

Figure 3:
FIGS. 3(a) to 3(c) present a comparison of mixed albedo, specular albedo and diffuse albedo of an image.

Referring also to FIG. 3, a mixed albedo image $I_U$ is shown in panel (a), specular reflectance $\rho_s$ is shown in panel (b) and diffuse reflectance $\rho_d$ is shown in panel (c).

The mixed albedo image $I_U$ shown in FIG. 3(a) is estimated from the sum of a binary spherical gradient X, Y, Z and its corresponding complement X*, Y*, Z*, and contains both diffuse reflectance $\rho_d$ and specular reflectance $\rho_s$. The specular reflectance $\rho_s$ shown in FIG. 3(b) is estimated from the difference in color saturation in reflectance under a binary spherical gradient X, Y, Z compared to its complement X*, Y*, Z* (as Equations (1) to (5)). The diffuse albedo $\rho_d$ shown in FIG. 3(c) is obtained by subtracting the specular reflectance $\rho_s$ shown in FIG. 3(b) from the mixed albedo image $I_U$ shown in FIG. 3(a).

First Method of Separating Photometric Normals

A first method of separating photometric normals utilises separated diffuse and specular albedo components $\rho_d$, $\rho_d$, which may be obtained according to the first method of albedo separation. However, the first method of separating photometric normals is equally applicable using specular albedo components $\rho_d$, $\rho_d$ obtained in any other way such as, for example, the hereinafter described alternative methods of albedo separation.

Once the albedo observed under uniform (full-on) illumination has been separated into a diffuse component $\rho_d$ and a specular component $\rho_s$, photometric surface normals obtained using binary spherical gradients may be separated into pure diffuse and specular normals using the first method of separating photometric normals.

Similar to the approach of Wilson et al. (WGP-10), the binary spherical gradients X, Y, Z and the corresponding complements X*, Y*, Z* can be used to compute photometric surface normals given as:

$$N_{mixed} = \frac{(X - X^*, Y - Y^*, Z - Z^*)}{\|(X - X^*, Y - Y^*, Z - Z^*)\|} \qquad (6)$$

In which $N_{mixed}$ is the mixed photometric normal, and X, X*, Y, Y*, Z, Z* represent pixel values in Equation (6). Unless indicated otherwise, the mixed photometric normal $N_{mixed}$ and other vector quantities (denoted in bold) referred to hereinafter should be assumed to be normalised unit vectors. The photometric normals $N_{mixed}$ are different for each pixel n, m, i.e $N_{mixed}(n,m)$ which may be written for the red R pixel values as:

$$N_{mixed}(n,m) = \frac{\begin{array}{l}(R_X(n,m) - R_{X*}(n,m), \\ R_Y(n,m) - R_{Y*}(n,m), R_Z(n,m) - R_{Z*}(n,m))\end{array}}{\|(R_X(n,m) - R_{X*}(n,m), \\ R_Y(n,m) - R_{Y*}(n,m), R_Z(n,m) - R_{Z*}(n,m))\|} \qquad (7)$$

Analogous expressions may be written for the green G, and blue B pixel values.

Consistent with the observations of Ma et al. (MHP-07), for human skin different amounts of surface detail may be observed in the photometric normals Nmixed computed from the red R, green G, and blue B channels respectively. Without wishing to be bound be theory, this is believed to be a result of different amounts of subsurface scattering of light in skin for these different wavelength ranges.

Figure 4:
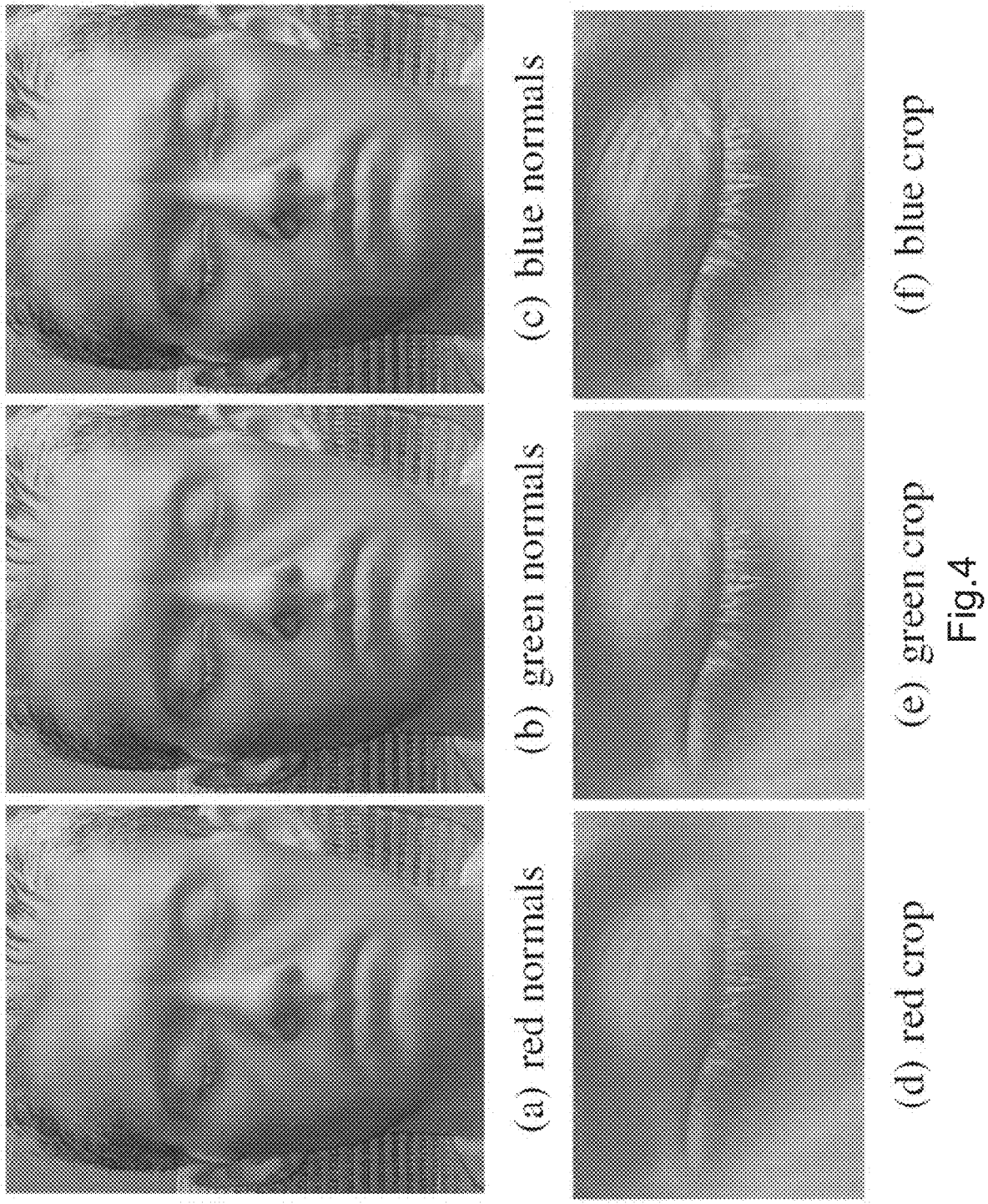
FIGS. 4(a) to 4(f) present a comparison of mixed photometric normals calculated using red, green and blue color channels.

Referring also to FIG. 4, mixed photometric normals $N_{mixed}$ obtained using red R, green G and blue B color channels are shown.

Panel (a) shows mixed photometric normals $N_{mixed}$ obtained using the red R color channel. Panel (d) shows a cropped and zoomed view of the subject's left eye in panel (a). Panel (b) shows mixed photometric normals $N_{mixed}$ obtained using the green G color channel. Panel (e) shows a cropped and zoomed view of the subject's left eye in panel (b). Panel (c) shows mixed photometric normals $N_{mixed}$ obtained using the blue B color channel. Panel (f) shows a cropped and zoomed view of the subject's left eye in panel (c).

It may be observed that for human skin, the surface details are increasingly visible for shorter wavelengths as seen in the crops (FIGS. 4(d) to 4(f)) around the subject's left eye. Thus, for imaging human subjects, the mixed photometric normals $N_{mixed}$ may be advantageously obtained using the blue B color channel. For application in imaging of other (non-human) subjects or objects, a different color channel may be selected and/or multiple color channels may be combined or averaged.

The computed mixed photometric normals $N_{mixed}$ include a mix of both diffuse and specular reflectance $\rho_d$, $\rho_s$, and consequently are not ideal for direct usage in computer graphic rendering.

Instead, the mixed photometric normal $N_{mixed}$ may be separated into a pure diffuse photometric normal and a pure specular photometric normal for shading with a diffuse and a specular Bidirectional Reflectance Distribution Function (BRDF) respectively.

The first method of separating photometric normals utilises the suv color space analysis of Mallick et al. (MZKB05), which is hereby incorporated by reference. The acquired binary spherical gradient images $I_X$, $I_Y$, $I_Z$ and their complement images $I_{X*}$, $I_{Y*}$, $I_{Z*}$ are transformed from RGB color space to Mallick's proposed suv space. This transformation rotates the RGB color information to align any white component in the original RGB signal with the s component, while leaving the chroma in the u and v components. Once transformed to the suv space of Mallick et al., the transformed binary spherical gradient images $I_X$, $I_Y$, $I_Z$ and their complement images $I_{X*}$, $I_{Y*}$, $I_{Z*}$ may be used to estimate a pure diffuse photometric normal as described hereinafter.

Without wishing to be bound be theory, it is believed that the chroma in colored dielectric materials is the result of absorption due to subsurface scattering, and that consequently the u and v components may be employed to recompute the photometric normals according to Equation (6) using only these purely diffuse components of the original RGB signal given as $(u^2+v^2)^{0.5}$. For example, if the RGB components $R_X(n,m)$, $G_X(n,m)$, $B_X(n,m)$ for the binary spherical gradient X are transformed to sub color space components $s_X(n,m)$, $u_X(n,m)$, $v_X(n,m)$, then a corresponding pure diffuse component $P_X(n,m)$ may be expressed as:

$$P_X(n,m) = \sqrt{((u_X(n,m))^2 + (v_X(n,m))^2)} \quad (8)$$

and analogous expressions may be written for each other binary spherical gradient Y, Z and complement X*, Y*, Z*. An estimate of the pure diffuse photometric normal $N_{u,v}$ may be estimated using Equation (6) with the pure diffuse components $P_X(n,m)$:

$$N_{u,v} = \frac{(P_X(n,m) - P_{X*}(n,m), P_Y(n,m) - P_{Y*}(n,m), P_Z(n,m) - P_{Z*}(n,m))}{\|(P_X(n,m) - P_{X*}(n,m), P_Y(n,m) - P_{Y*}(n,m), P_Z(n,m) - P_{Z*}(n,m))\|} \quad (9)$$

This estimate of photometric normal $N_{u,v}$ provides an estimate of a pure diffuse photometric normal which is very smooth in its appearance. Without wishing to be bound be theory, the smooth appearance is believed to be due to blurring of surface details with subsurface scattering.

Figure 5:
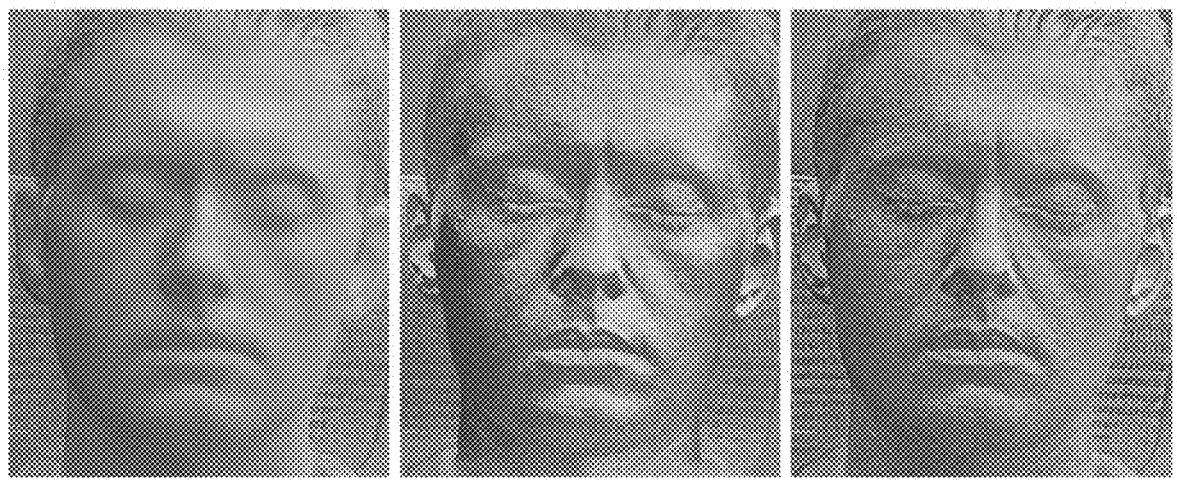
FIGS. 5(a) to 5(c) respectively present a comparison of diffuse photometric normals, initially estimated specular photometric normals, and synthesized specular photometric normals.

Referring also to FIG. 5, diffuse photometric normals $N_{u,v}$, specular normals $N_{spec}$ and corrected specular normals $N_{corr}$ are shown.

Diffuse photometric normals $N_{u,v}$ calculated according to Equation (9) are shown in panel (a). Panel (b) shows specular normals $N_{spece}$ calculated as described hereinafter and panel (c) shows corrected specular normals $N_{corr}$ calculated as described hereinafter.

A specular photometric normal $N_{spec}$ may be estimated from the separated diffuse and specular albedo components $\rho_d$, $\rho_s$ and the estimated diffuse photometric normals $N_{u,v}$. This separation of specular photometric normals $N_{spec}$ is based, at least in part, on the inventors' observation that surface details are clearly visible in the acquired mixed photometric normals Nmixed. Surface details are particularly visible in the normals $N_{mixed}$ calculated using shorter green G and blue B wavelengths.

Without wishing to be bound by theory, this is considered to imply that the mixed normals $N_{mixed}$ encode a mixture of a diffuse normal $N_{u,v}$ and some specular information. The contribution of the specular information to the mixed normals $N_{mixed}$ is strongest in the blue B channel for imaging of human skin. Based on these observations, the specular normals may be estimated according to a mixture model:

$$N_{mixed} \propto \alpha N_{u,v} + (1-\alpha) R_{spec} \quad (10)$$

In which $R_{spec}$ is an unknown reflection vector. In general, each normal $N_{mixed}$, $N_{u,v}$ and the reflection vector $R_{spec}$ vary with pixel position n, m, i.e. $N_{mixed}(n,m)$, $N_{u,v}(n,m)$ and $R_{spec}(n,m)$, and the mixture weigh $\alpha$ also varies with pixel position $\alpha(n,m)$. Equation (10) approximates the acquired mixed photometric normal $N_{mixed}$ to be the result of a linear combination of the pure diffuse normal $N_{u,v}$ obtained using color-space separation, and the unknown reflection vector $R_{spec}$.

The mixture weights $\alpha(n,m)$ for the linear combination are obtained from the relative strengths of the diffuse and specular reflectance $\rho_d$ and $\rho_s$ respectively, according to:

$$\alpha(n,m) = \frac{\rho_d(n,m)}{\rho_d(n,m) + \rho_s(n,m)} \quad (11)$$

The mixture weights $\alpha(n,m)$ may be calculated using data from any of the red R, green G or blue B color channels. It may be noted that the specular reflectance $\rho_s$ does not vary with color channel as the specular reflectance is white (R=G=B). For the specific application of imaging human skin, as already noted surface details are best resolved using the blue B color channel. Consequently, for calculating the unknown vector $R_{spec}$ for a human subject, the blue B color channel may used both for calculating the mixed normals $N_{mixed}$ and for calculating the mixture weights $\alpha(n,m)$. However, the inventors have empirically determined that using the green G color channel to calculate the mixture weights $\alpha(n,m)$ provides reduced noise compared to the blue B color channel, without sacrificing surface details. For other imaging applications, other color channels, or combinations of multiple color channels, may be used instead of the blue B channel.

The unknown reflection vector $R_{spec}$ can be estimated by re-arranging Equation (10) for $R_{spec}$ and normalising to obtain:

$$R_{spec} = \frac{N_{mixed} - \alpha N_{u,v}}{\|N_{mixed} - \alpha N_{u,v}\|} \quad (12)$$

It may be note that in Equation (12), the division by a factor of $(1-\alpha)$ from Equation (10) need not be included due to the normalization. The inventors also noted that omitting the division by a factor of $(1-\alpha)$ may also be beneficial for numerical stability.

The specular normal $N_{spec}$ is computed as the half-vector given the viewing direction V and the estimated reflection vector $R_{spec}$:

$$N_{spec} = \frac{V + R_{spec}}{\|V + R_{spec}\|} \quad (13)$$

in which the viewing direction V is the direction from which the images are obtained.

Referring in particular to FIG. 5(b), it may be observed that the specular normals $N_{spec}$ estimated using Equation (13) exhibit very fine scale skin surface details such as, for example, fine scale wrinkles, pores, and scarring on the forehead. Such details are not visible in the pure diffuse normal $N_{u,v}$ (FIG. 5(a)). However, it may also be observed that the specular normals $N_{spec}$ directly obtained with Equation (13) appear to include a low-frequency bias. Without wishing to be bound by theory, the existence of low-frequency bias in the specular normal $N_{spec}$ believed to result from the use of $N_{spec}$ binary spherical gradient illumination for estimating the specular reflection vector $N_{spec}$, which results in eight discrete quadrants over the sphere of directions.

Figure 6:
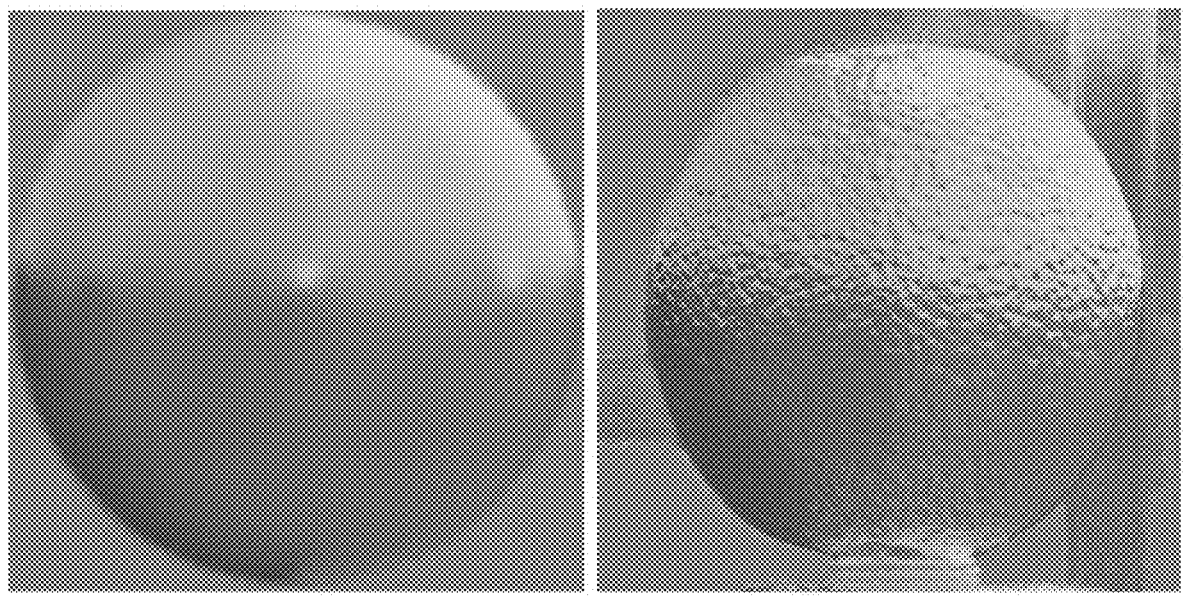
FIGS. 6(a) and 6(b) present a comparison of specular photometric normals estimated for a simulated sphere and a real orange.

Referring also to FIG. 6, specular normals directly estimated with binary spherical gradients are shown for a simulated dielectric sphere in panel (a), and for a real orange in panel (b).

In may be observed that the specular normals directly estimated with binary spherical gradients X, Y, Z and complements X*, Y*, Z* appear to exhibit eight discrete spherical quadrants.

Employing Equations (12) and (13) to estimate the specular normals $N_{spec}$ appears to add a small amount of smooth variation (gradient) across the discrete quadrants, which can be more clearly seen on a real acquired spherical object, for example the orange shown in FIG. 6b. Without wishing to be bound by theory, it is believed that this small gradient across the quadrants is the result of non-linear Fresnel gain in the specular reflectance (as a function of the scalar product N.V) which is encoded both in the mixed normal $N_{mixed}$ and the mixture weight $\alpha$ (due to Fresnel effects being incorporated into $\rho_s$) in the mixture model of Equation 12. A combination of such a Fresnel resultant gradient and surface specular roughness may help to create a desirably smooth variation in the high frequency of the estimated specular normal field $N_{spec}$ (n,m). However, since the specular normals $N_{spec}$ appear to include a low-frequency bias, the normals $N_{spec}$ are non-ideal for use as specular normals for computer graphics rendering purposes.

With the aim of obtaining an estimate of the specular normals $N_{spec}$ which is better suited for use in computer graphics rendering, a method has been developed to synthesize a corrected specular normal $N_{corr}$ with improved low-frequency content, whilst also incorporating the high frequency surface details contained in the directly estimated specular normal vector $N_{spec}$. A corrected specular normal $N_{corr}$ may be obtained by applying a high-pass filter to the directly estimated specular normal vector $N_{spec}$, and adding the output of the high-pass filter to the low frequency diffuse normal $N_{u,v}$ obtained using color-space separation. The corrected specular normal $N_{corr}$(n,m) for each pixel n, m is then re-normalised to unit length.

Referring in particular to FIG. 5(c), the corrected specular normals $N_{corr}$ obtained using this procedure is shown. The corrected specular normals $N_{corr}$ do not include the low frequency bias of the directly estimated specular normals $N_{spec}$, and may be more suitable for computer graphics rendering applications.

Spectral Multiplexing

The first method of albedo separation and the first method of separating photometric normals have been described based on diffuse-specular separation of the first to sixth images $I_X$, $I_Y$, $I_Z$, $I_{X^*}$, $I_{Y^*}$, $I_{Z^*}$ obtained using the binary spherical gradients X, Y, Z and complements X*, Y*, Z*. Although the first method of albedo separation and the first method of separating photometric normals only require six images, it would be preferable to further reduce the number of images required. This is because the fewer images are needed, the less a subject may move between images and the greater the correspondence between pixels n, m across the image set. This factor is not a concern when the imaged object is inanimate.

Spectral multiplexing may be used to encode the binary spherical gradients X, Y, Z and complements X*, Y*, Z* into only two illumination conditions, enabling a two-image acquisition approach. The spectral multiplexing uses the RGB LED lamps of the LED sphere 1 to simultaneously emit the three principal binary spherical gradients along X, Y and Z multiplexed in individual RGB color channels.

For example, a first multiplexed illumination condition may encode the first binary spherical gradient X in the green G color channel, the second binary spherical gradient Y in the blue B color channel and the third binary spherical gradient Z in the red R color channel. The first multiplexed illumination condition is used to obtain a seventh image $I_G(n,m)=(R_Z(n,m), G_X(n,m), B_Y(n,m))$ encoding all three binary spherical gradients X, Y, Z.

A second illumination condition may encode the first complement X* in the green G color channel, the second complement Y* in the blue B color channel and the third complement Z* in the red R color channel. The second multiplexed illumination condition is used to obtain an eighth image $I_C(n,m)=(R_{Z^*}(n,m), G_{X^*}(n,m), B_{Y^*}(n,m))$ encoding all three complements X*, Y*, Z*.

Figure 7:
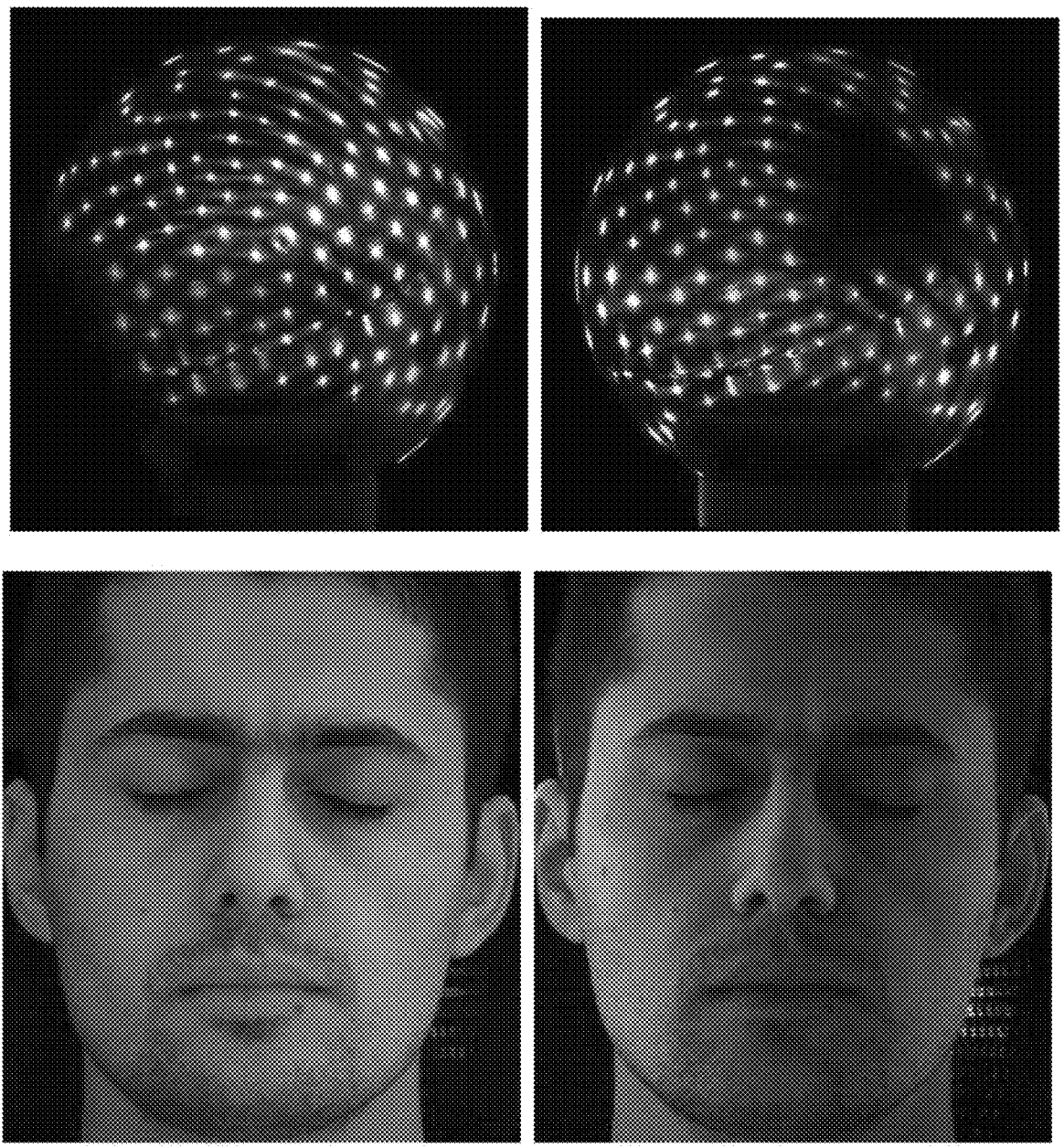
FIGS. 7(a) and (7b) present examples of images encoding spectrally multiplexed binary spherical RGB gradients.

Referring also to FIG. 7, examples of spectrally multiplexed seventh $I_G$ and eighth $I_C$ imaged encoding binary spherical RGB gradients are shown.

Panels (a) on the right hand side of FIG. 7 show a seventh image $I_G$ of a mirror ball in the top row, and a seventh image $I_G$ of a subject in the bottom row. Panels (b) on the left had side of FIG. 7 show an eighth image $I_C$ of a mirror ball in the top row, and an eighth image $I_C$ of a subject in the bottom row.

The proposed mapping of X and X* to green G, Y and Y* to blue B, and Z and Z* to red R has been developed because the inventors have observed that for imaging of human subjects, this mapping provides optimal surface details in the photometric normals with X and Y variation (left-right and up-down variation in the images $I_G$, $I_C$) encoded in shorter wavelengths (green G and blue B) having relatively lower amounts of subsurface scattering. The Z variations (towards-away from the camera which obtains the image $I_G$, $I_C$) are encoded in the longer wavelength (red R), which exhibits relatively higher amounts of scattering in skin.

However, it should be noted that for different applications and/or for imaging of other objects and/or non-human subjects, the mapping of binary spherical gradient-complement pairs X-X*, Y-Y*, Z-Z* to RGB color channels may be different, without affecting the methods described hereinafter.

Additionally, the seventh image $I_G$ need not encode all the binary spherical gradients X, Y, Z whilst the eight image $I_C$ encodes all the complements X*, Y*, Z*. In some examples, a seventh image $I_7$ may encode either the binary spherical gradient X or the complement X*, whilst an eighth image $I_8$ encodes the other of the binary spherical gradient X and complement X* in the same color channel. Similarly, the seventh image $I_7$ may encode either the binary spherical gradient Y or the complement Y* and either the binary spherical gradient Z or complement X*, whilst the eighth image $I_8$ encodes the other of the binary spherical gradient Y and complement Y* and the other of the binary spherical gradient Z and complement Z*.

The acquired spectrally multiplexed data in the form of a seventh image $I_G(n,m)=(R_Z(n,m), G_X(n,m), B_Y(n,m))$ and an eighth image $I_C(n,m)=(R_{Z*}(n,m), G_{X*}(n,m), B_{Y*}(n,m))$ may be employed as input to a second method of albedo separation and a second method of separating photometric normals.

Second Method of Separating Photometric Normals

Adding together the seventh and eighth images $I_G+I_C$ yields a uniform image $I_U$ which is equivalent to an image acquired under full-on white illumination. The uniform image $I_U$ provides an estimate of the mixed albedo.

Figure 8:
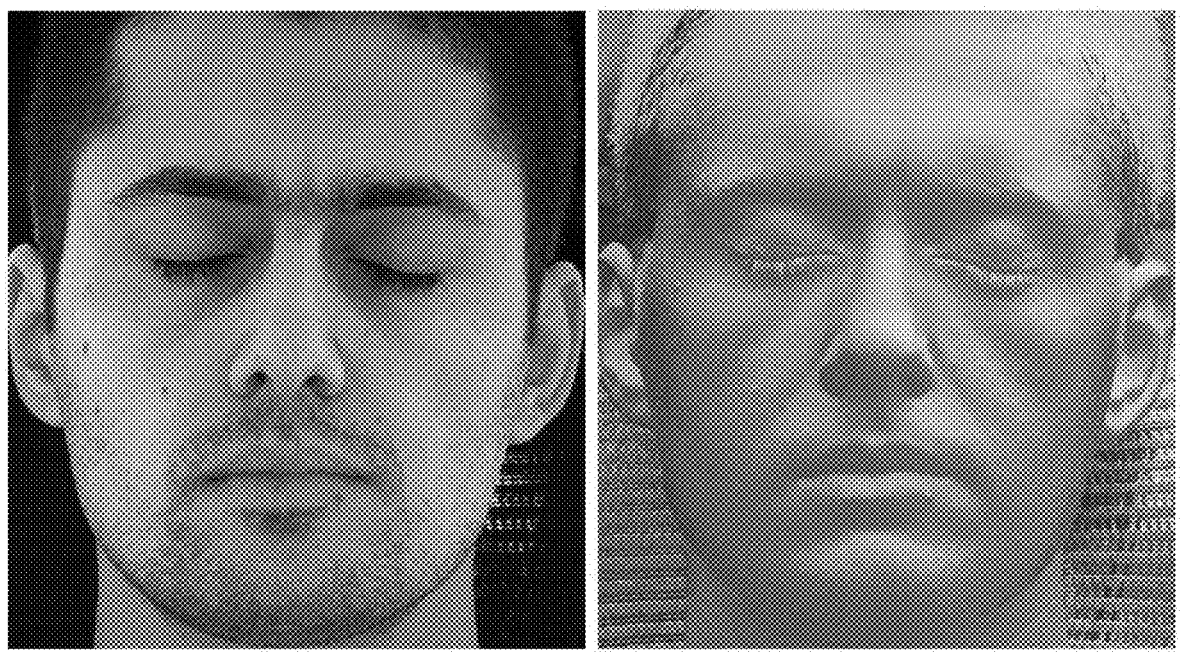
FIGS. 8(a) and 8(b) present a comparison of mixed albedo and mixed photometric normals obtained from images encoding spectrally multiplexed binary spherical RGB gradients.

Referring also to FIG. 8, panel (a) shows the mixed albedo in the form of a uniform image $I_U$ and panel (b) shows mixed normals $N_{mixed}$ computed from the seventh and eighth images $I_G$, $I_C$ acquired using spectrally multiplexed RGB binary spherical gradient illumination.

The mixed normals $N_{mixed}$ may be calculated by applying Equation (6) to the available color components corresponding to the binary spherical gradients X, Y, Z and complements X*, Y*, Z*:

$$N_{mixed}(n, m) = \frac{(G_X(n, m) - G_{X*}(n, m), B_Y(n, m) - B_{Y*}(n, m), R_Z(n, m) - R_{Z*}(n, m))}{\|(G_X(n, m) - G_{X*}(n, m), B_Y(n, m) - B_{Y*}(n, m), R_Z(n, m) - R_{Z*}(n, m))\|} \quad (14)$$

Referring again to FIG. 8(b), an example of mixed normals $N_{mixed}$ is shown corresponding to the mixed albedo shown in FIG. 8(a).

The first method of albedo separation and the first method of separating photometric normals used white illumination. The spectrally multiplexed second methods do not, and consequently the hereinbefore described color-space suv separation is not applicable to analysis of the seventh and eighth images $I_G$, $I_C$.

Instead, the second method of separating photometric normals applies a heuristic approach for separation of the mixed photometric normals $N_{mixed}$. An approximation to the diffuse normal map $N_{blur}$ is obtained by spatial blurring of the mixed photometric normals $N_{mixed}(n,m)$. In some simple examples, the blurred normal map $N_{blur}$ may be obtained using simple averaging over a local region:

$$N_{blur}(n, m) = \sum_{i=1}^{2F+1} \sum_{j=1}^{2K+1} A(i, j) \times N_{mixed}(n - F - 1 + i, m - k - 1 + j) \quad (15)$$

followed by re-normalisation to unit length. In Equation (15) A(i,j) denotes weighting coefficients used in the blurring, F and K are integers denoting the number of pixels to either side of pixel n, m to which the blurring region should extend. Collectively, A(i,j), F and K may be referred to as a "blur kernel". In some examples the blur kernel may be flat, i.e. all A(i,j) constant, to provide a simple averaging. In other examples, the blur kernel may be based on, for example, Gaussian functions (or even a Bilateral filter kernel) on i,j centred at the pixel n, m. The size 2F+1, 2K+1 of the blur kernel is not particularly limited, larger widths will provide more significant spatial blurring.

Figure 9:
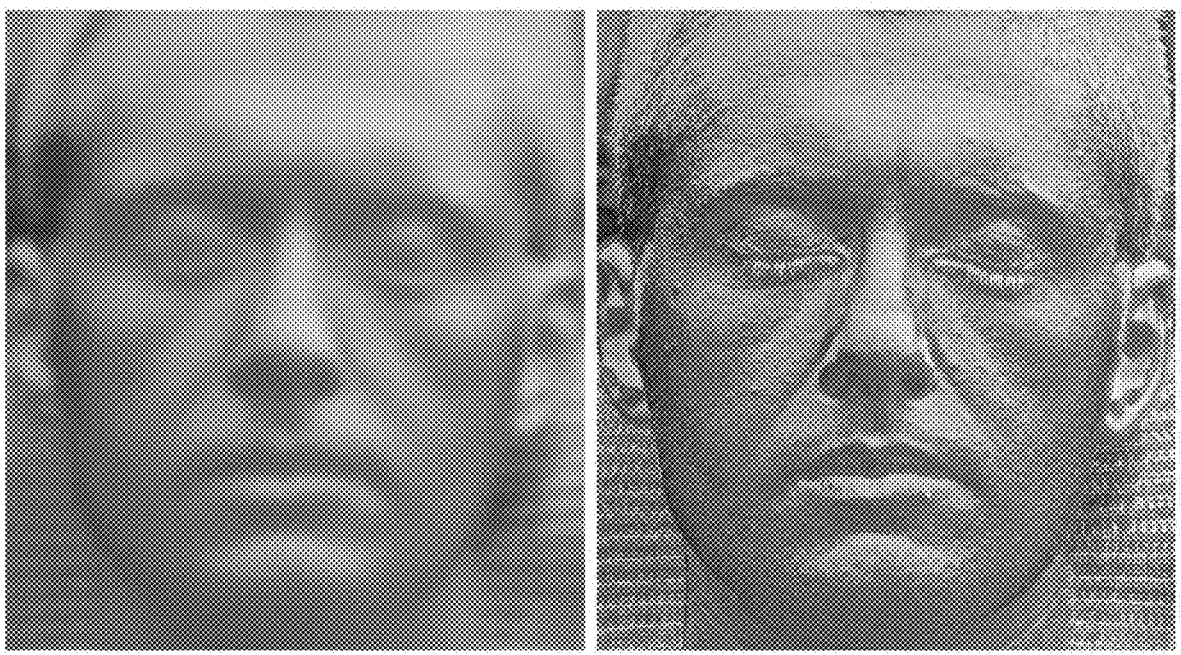
FIGS. 9(a) and 9(b) present a comparison of blurred diffuse photometric normal and synthesized photometric normals approximating the specular photometric normal.

Referring also to FIG. 9, panel (a) shows an example of blurred diffuse normals $N_{blur}$ and panel (b) shows synthesized normals $N_{synth}$ approximating the specular normals $N_{spec}$ and estimated from the mixed photometric normals $N_{mixed}$ obtained using seventh and eighth images $I_G$, $I_C$.

For the example shown in FIG. 9(a), the blur kernel A(i,j) was empirically selected (for the example of the images shown in FIG. 9, the blur kernel A(i,j) was a Gaussian of width 30 pixels, images of other objects or obtained using a different camera may use alternative blur kernels A(i,j)) to produce a smooth normal map $N_{blur}$ that is qualitatively similar to the diffuse normals $N_{u,v}$ obtained using color-space separation according to the first method of separating photometric normals.

The specular normal map $N_{spec}$ is then estimated by first subtracting the blurred diffuse normals $N_{blur}$ from the mixed normals $N_{mixed}$:

$$N_\Delta(n, m)=N_{mixed}(n, m)-N_{blur}(n, m) \quad (16)$$

followed by re-normalisation to unit length, and in which $N_\Delta$ is an intermediate difference map providing a first approximation to the specular normal map $N_{spec}$. The intermediate difference map $N_\Delta$ may be used as a rough estimate of the specular normal map $N_{spec} \neq N_\Delta$. The intermediate difference map $N_\Delta$ isolates the high spatial frequencies present in the mixed normals such as, for example, features due to skin pores, fine wrinkles, scars and so forth.

Alternatively, the inventors have empirically established that a synthesized estimate of the specular normal map $N_{synth}$ having improved properties for computer graphic rendering may be obtained by scaling up the intermediate difference map $N_\Delta$ (without renormalizing) and adding it back to the blurred normal map $N_{blur}$ according to:

$$N_{syn}(n, m)=\beta N_\Delta(n, m)+N_{blur}(n, m) \quad (17)$$

followed by re-normalisation to unit length, and in which β is a scaling factor. For example, the synthesized normals $N_{synth}$ shown in FIG. 9(b) were determined using a scaling factor of β=2.

Referring again to FIG. 9(b), the synthesized normals $N_{synth}$ may be observed to be qualitatively comparable to the more directly calculated corrected specular normals $N_{corr}$ shown in FIG. 5(c) and obtained using data from white light illumination.

Second Method of Albedo Separation

A second method of separating the mixed albedo $I_U$, for example as shown in FIG. 8(a), into diffuse and specular components $\rho_d$, $\rho_s$ requires an estimate of diffuse normals to have been calculated previously. The blurred normals $N_{blur}$ may be used for the purpose of the second method of albedo separation.

According to the second method of separating the albedo, instead of formulating the albedo separation with color-space analysis as in the first method, the diffuse and specular components of albedo are formulated as a linear system. The data from each color channel are treated independently in the acquired seventh and eighth images $I_G$, $I_C$, in order to obtain two observations under every principal binary spherical gradient X, Y, Z and the corresponding complement X*, Y*, Z*.

In the first method, the concepts of light and dark pixels $I_L$, $I_D$ was employed. Similar considerations apply to the spectrally multiplexed seventh and eighth images $I_G$, $I_C$, except that because of the spectral multiplexing a particular pixel n, m for, for example the seventh image $I_G(n,m)=(R_Z(n,m), G_X(n,m), B_Y(n,m))$, may be a light pixel in one color channel and a dark pixel in a different channel.

Treating each color channel separately, for each pixel n, m, a light value $R_L$, $G_L$, $B_L$ and a dark value $R_D$, $G_D$, $B_D$ may be assigned. For example, for the red R channel the assignment is according to:

$$R_L(n, m) = \begin{cases} R_Z(n, m) & \text{if } R_Z(n, m) \geq R_{Z^*}(n, m) \\ R_{Z^*}(n, m) & \text{if } R_Z(n, m) < R_{Z^*}(n, m) \end{cases} \quad (18)$$

The light and dark values $G_L$, $B_L$, $G_D$, $B_D$ for the green G and blue B color channels are similarly defined based on the values of the seventh image $I_G(n,m)=(R_Z(n,m), G_X(n,m), B_Y(n,m))$ and the eighth image $I_C(n,m)=(R_{Z^*}(n,m), G_{X^*}(n,m), B_{Y^*}(n,m))$.

The diffuse-specular albedo separation according to the second method is formulated as a solution to a linear system. As an example, for the red channel:

$$\begin{bmatrix} R_L(n, m) \\ R_D(n, m) \end{bmatrix} = \begin{bmatrix} N_d(n, m) & 1 \\ (1 - N_d(n, m)) & 0 \end{bmatrix} \begin{bmatrix} D_R(n, m) \\ S_R(n, m) \end{bmatrix} \quad (19)$$

In which $D_R(n,m)$ is the diffuse component of the red R channel, $S_R(n,m)$ is the specular component of the red R channel and $N_d(n,m)$ is the corresponding (red R) component of the diffuse normal (shifted to the range [0;1]) for the corresponding principal direction, which for the red R channel in this example is the z-axis corresponding to binary spherical gradient Z and complement Z*. Analogous expressions are used for the green G and blue B color channels.

In the second method of albedo separation, the values of $N_d(n,m)$ are provided by the blurred normals $N_{blur}$ obtained by blurring the mixed photometric normals $N_{mixed}$. For each pixel n, m, Equation (19) is solved to obtain estimates of the diffuse and specular components $D_R(n,m)$, $S_R(n,m)$, and equivalent expressions are solved to obtain the diffuse and specular components from green and blue channels $D_G(n,m)$, $D_B(n,m)$, $S_G(n,m)$, $S_B(n,m)$. Assuming monochromatic specular reflection, an estimate of the specular reflectance $\rho_s(n,m)$ for the pixel n, m may be obtained as the median of the three independently calculated estimates $\rho_s(n,m)=\text{median}\{S_R(n,m), S_G(n,m), S_B(n,m)\}$. Alternatively, the specular reflectance $\rho_s(n,m)$ may be calculated as a mean, or a weighted mean, of the color channel estimates $S_R(n,m)$, $S_G(n,m)$, $S_B(n,m)$. Finally, an estimate of the diffuse reflectance $\rho_d$ is obtained by pixelwise subtracting the specular reflectance $\rho_s$ from the mixed albedo $I_U$.

Figure 10:
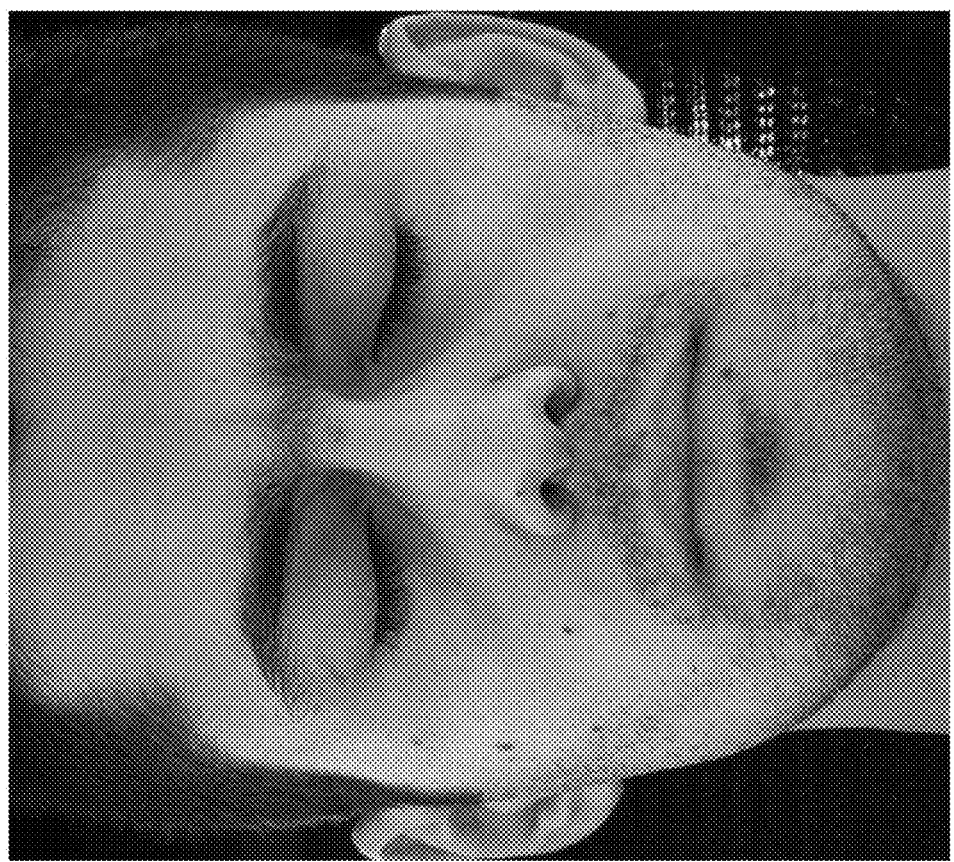
FIGS. 10(a) and 10(b) present separated specular reflectance and diffuse reflectance obtained from images encoding spectrally multiplexed binary spherical RGB gradients.
Figure 10:
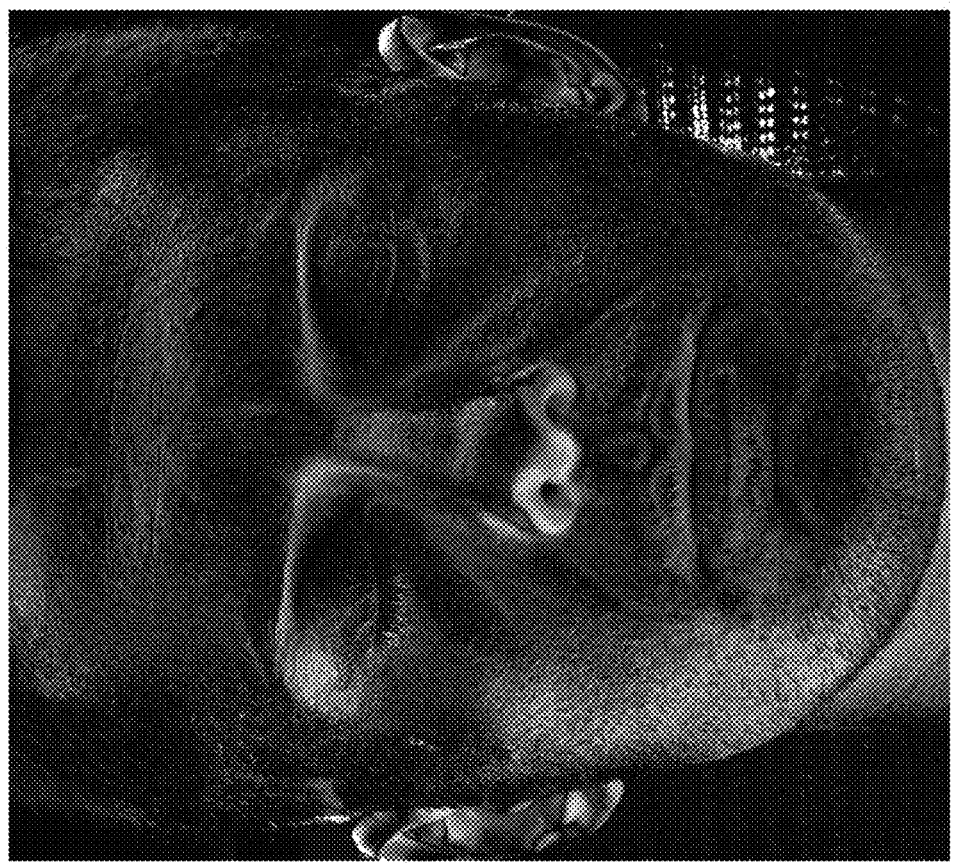

Referring also to FIG. 10, panel (a) shows separated specular reflectance $\rho_s(n,m)$ obtained by solving the linear system as Equation (19), and panel (b) shows the diffuse reflectance $\rho_d(n,m)$ calculated by subtracting the specular reflectance $\rho_s(n,m)$ shown in FIG. 10(a) from the mixed albedo shown in FIG. 8(a).

Comparison to Polarized Linear Gradient Illumination

The utility of the methods of the present specification may be placed in context by comparing it to previous methods based on polarized linear spherical gradients. In polarized light methods, the orientation of polarizers on both light sources and cameras must be meticulously aligned.

Figure 11:
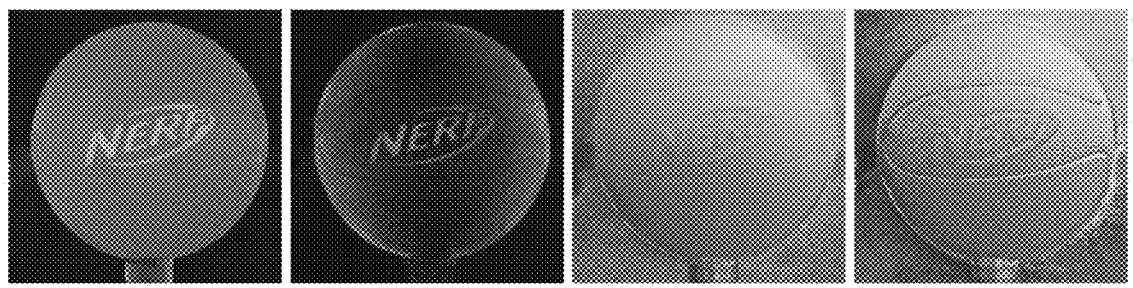
FIGS. 11(a) to 11(d) respectively present diffuse reflectance, specular reflectance and photometric normals for a ball, comparing binary spherical gradient illumination with polarized linear spherical gradient illumination.
FIGS. 11(e) to 11(h) respectively present diffuse reflectance, specular reflectance and photometric normals for a human subject, comparing binary spherical gradient illumination with polarized linear spherical gradient illumination.
Figure 11:

Referring also to FIG. 11, acquired diffuse albedo $\rho_d$ and specular albedo $\rho_s$ and photometric normals acquired using binary spherical gradient X, Y, Z illumination according the first method of albedo separation and the first method of separating photometric normals as shown in the top-row of each of panels (a) to (h). The bottom row of each panel shows a corresponding image obtained using polarized linear spherical gradient illumination.

Images for the present methods and for the prior method of Ghosh et al. were obtained for an orange rubber ball (FIGS. 11(a) to 11(d)) and for a human subject (FIGS. 11(e) to 11(h)). The polarized linear spherical gradient illumination images were obtained using the method described by Ghosh et al. (GFT-11). The LED sphere 1 was polarised with the latitude-longitude linear polarization pattern proposed by Ghosh et al. for this comparison, and data was acquired for the binary spherical gradients X, Y, Z and complements X*, Y*, Z* with both polarization banks switched on to achieve unpolarized illumination.

It may be observed that the separated albedo and photometric normals acquired using the methods of the present specification using binary spherical gradients X, Y, Z and complements X*, Y*, Z* are qualitatively comparable to those acquired using polarized spherical gradients. Furthermore, the data which needs to be acquired for the methods of the present specification requires half the number of photographs (six) compared to that required with polarized spherical gradients for multiview capture.

Quantitative differences were computed between the acquired maps of the orange ball using both the present methods and the method of Ghosh et al. (GFT-11). The differences are as follows: diffuse albedo=0.064 RMSE (root mean square error); specular albedo=0.02 RMSE, diffuse normal=8.93° angular RMSE, specular normal=14.21° angular RMSE.

The u, v diffuse normal $N_{u,v}$ obtained using the first method of separating photometric normals was compared against the red diffuse normal obtained with polarized linear spherical gradients, because these normals are qualitatively the most similar in terms of blurring. It may be observed the that the chroma based $N_{u,v}$ diffuse normal computed according to the present specification is qualitatively slightly softer than that obtained using cross-polarized linear spherical gradient illumination.

In contrast, the specular normal $N_{spec}$, $N_{corr}$ obtained according to the present specification exhibits slightly sharper surface details than that obtained using polarized linear spherical gradients. Without wishing to be bound by theory, this is believed to be because any surface details missing in the calculated diffuse normal $N_{u,v}$ (for example due to subsurface scattering) is attributed instead to the specular normal $N_{spec}$, $N_{corr}$ as a result of Equations (12) and (13).

Figure 12:
FIGS. 12(a) and 12(b) present a comparison of a hybrid computer graphics rendering in panel (a) and a photograph in panel (b)
Figure 12:
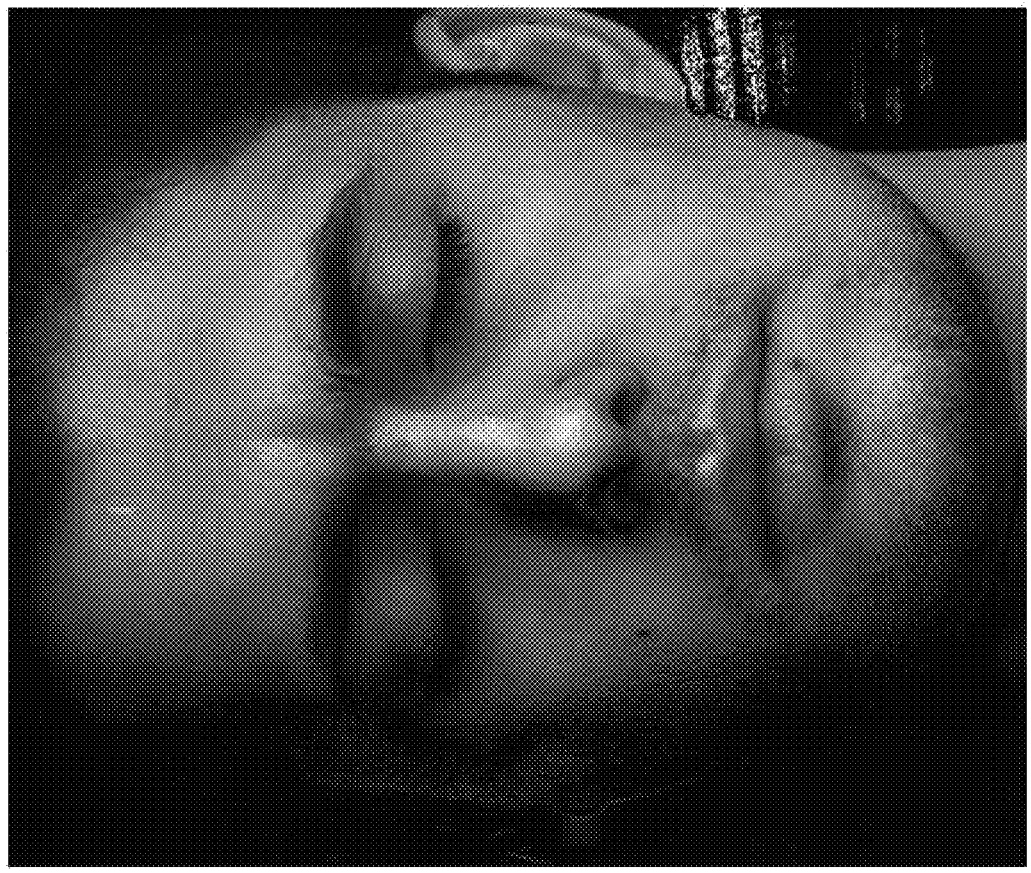

Referring also to FIG. 12, a hybrid normal rendering shown in panel (a) is compared against a photograph shown in panel (b).

The rendering of FIG. 12(a) was generated using data acquired with binary spherical gradients X, Y, Z and complements X*, Y*, Z* according to the present specification. The photograph of FIG. 12(b) was obtained using a point light source.

It may be observed that the hybrid normal rendering (FIG. 12(a)) using the estimated diffuse and specular albedo $\rho_d$, $\rho_s$ and photometric normals $N_{u,v}$, $N_{corr}$ closely approximates the facial appearance in the photograph, with the exception of self-occlusions around the nose and the subject's neck which are not modelled in the rendering (FIG. 12(a)).

Specular Normals and Binary Illumination

It may be noted that besides albedo separation into diffuse and specular components $\rho_d$, $\rho_s$, estimating a high quality specular normal using binary spherical gradient X, Y, Z illumination is also a key teaching of the present specification. However, these results are also surprising given the binary nature of the incident illumination using the binary spherical gradients X, Y, Z and complements X*, Y*, Z*.

Unlike previous work which has employed an explicit linear spherical gradient in the incident illumination, for example Ma et al. (MHP-07) or Ghosh et al. (GFT-11), the methods of the present specification exploit an implicit (non-linear) gradient due to Fresnel to estimate the high frequency component of the specular normal field.

The observation of the inventors that Fresnel can be exploited for this purpose even under constant (or binary) illumination is an important teaching of the present specification. Besides being useful for realistic rendering of high frequency specular detail, the estimated specular normals $N_{spec}$, $N_{corr}$, $N_{synth}$ may also be employed for embossing mesoscopic surface details on a base geometry, for example as described by Ma et al. (MHP-08) and in NEHAB D., RUSINKIEWICZ S., DAVIS J., RAMAMOORTHI R.: Efficiently combining positions and normals for precise 3d geometry. ACM Trans. Graph. 24, 3 (July 2005), 536-543 (hereinafter "NRDR-05").

Arbitrary and Multi-View Capture

In many prior methods for capturing and separating albedo and photometric normals, the relative positioning of a camera used to obtain images is required to be carefully aligned with the illumination conditions, for example polarized linear spherical gradients.

By contrast, provided that the relative position of the camera is known, the camera may be oriented at an arbitrary viewpoint to the first, second and third axes x, y, z with reference to which the binary spherical gradients X, Y, Z and complements X*, Y*, Z* are defined. After capturing the first to sixth images $I_X$, $I_Y$, $I_Z$, $I_{X*}$, $I_{Y*}$, $I_{Z*}$ or the seventh and eight images $I_G$, $I_C$, the images may be simply transformed to local coordinates of camera (using a 3D rotation), followed by processing as described hereinbefore.

In addition to permitting an arbitrary orientation of the camera viewpoint, this property of methods according to the present specification also permits views to be captured from multiple cameras having different viewpoints simultaneously and using the same illumination conditions. The images for each viewpoint may then simply be rotated to the local frame of reference for albedo and normal separation.

As already defined, the x- and y-axes are relative to x-, y- and z-axes with respect to an image acquired by a camera looking towards the coordinate system origin along the direction $\theta=\pi/2$, $\varphi=0$, using the spherical polar coordinates used to define the binary spherical gradients X, Y, Z and complements X*, Y*, Z*. The x-axis is parallel to the image plane and corresponds to binary spherical gradient X and complement X*. The y-axis is parallel to the image plane and corresponds to the binary spherical gradient Y and complement Y*. The z-axis is perpendicular to the image plane and corresponds to the binary spherical gradient Z and complement Z*.

For white light illumination, first to sixth images are obtained $I_X$, $I_Y$, $I_Z$, $I_{X*}$, $I_{Y*}$, $I_{Z*}$ by a camera, which for the purposes of explanation will be presumed to be pointing towards the origin of the spherical polar coordinates (r, $\theta$, $\varphi$) along a direction different from $\theta=\pi/2$, $\varphi=0$. The first to sixth images $I_X$, $I_Y$, $I_Z$, $I_{X*}$, $I_{Y*}$, $I_{Z*}$ need to be rotated to generate local images $I'_X$, $I'_Y$, $I'_Z$, $I'_{X*}$, $I'_{Y*}$, $I'_{Z*}$ corresponding to the local axes x', y', z' relative to the camera. The rotation method shall be described in relation to obtaining the image $I'_X$ corresponding to a local x'-axis of the camera. The method is equivalent for rotations to obtain the other local images $I'_Y$, $I'_Z$, $I'_{X*}$, $I'_{Y*}$, $I'_{Z*}$.

The rotation is carried out for each pixel n, m separately, defining vectors for each color channel:

$$R(n, m) = \begin{pmatrix} R_X(n, m) \\ R_Y(n, m) \\ R_Z(n, m) \end{pmatrix}, \quad (20)$$

$$G(n, m) = \begin{pmatrix} G_X(n, m) \\ G_Y(n, m) \\ G_Z(n, m) \end{pmatrix}, B(n, m) = \begin{pmatrix} B_X(n, m) \\ B_Y(n, m) \\ B_Z(n, m) \end{pmatrix}$$

For each pixel n, m the initial vectors R, G, B are remapped to vectors $F_R$, $F_G$, $F_B$, by converting components of the vectors R, G, B from a normalised range of 0 to 1, to a normalised range of −1 to 1 for corresponding components of the vectors $F_R$, $F_G$, $F_B$. For example, for the components or $F_R$:

$$F_R(n, m) = \begin{pmatrix} 2R_X(n, m) - 1 \\ 2R_Y(n, m) - 1 \\ 2R_Z(n, m) - 1 \end{pmatrix} \quad (21)$$

and similar for $F_G$ and $F_B$. Next, we formulate a 3 by 3 rotation matrix $R_V$ which is simply a standard rotation matrix between the reference direction (0,0,1) in the x, y, z frame used to define the illumination conditions X, Y, Z, X*, Y*, Z* and a view direction V of the camera (which corresponds to (0,0,1) in the local x', y', z' frame). Rotated vectors $F'_R$, $F'_G$ and $F'_B$ are calculated according to:

$$F'_R = R_V \times F_R, \ F'_G = R_V \times F_G, \ F'_B = R_V \times F_B \quad (22)$$

Followed by re-mapping of the components of $F'_R$, $F'_G$ and $F'_B$ to the range 0 to 1 to form rotated color vectors R', G', B'. Once calculated for each pixel n, m, the components of the rotated color vectors R', G', B' may be used to re-construct rotated first to sixth local images I'$_X$, I'$_Y$, I'$_Z$, I'$_{X*}$, I'$_{Y*}$, I'$_{Z*}$. For example, I'$_X$(n,m)={R'$_X$(n,m), G'$_X$(n,m), B'$_X$(n, m)}.

The same rotation may be applied to the spectrally multiplexed seventh and eighth images I$_G$, I$_C$ to obtain local seventh and eighth images I'$_G$, I'$_C$, by rotation using rotation matrix R$_V$ of the vectors:

$$F_7 = \begin{pmatrix} 2G_X(n,m)-1 \\ 2B_Y(n,m)-1 \\ 2R_Z(n,m)-1 \end{pmatrix}, F_8 = \begin{pmatrix} 2G_{X*}(n,m)-1 \\ 2B_{Y*}(n,m)-1 \\ 2R_{Z*}(n,m)-1 \end{pmatrix} \quad (23)$$

In which the exemplary mapping of X, X* to green G, Y, Y* to blue B and Z, Z* to red R used purely for the purpose of providing a definite example.

In this way, an object may be imaged from multiple angles simultaneously, using either six illumination conditions for white illumination, or only two illumination conditions when spectrally multiplexed. The images obtained for each camera may be rotated to images local to that cameras viewpoint V, and subsequently processed as described in this specification.

Third Method of Separating Albedo

A third method of separating albedo into diffuse and specular components $\rho_d$, $\rho_s$ is the same as the first method, except that instead of determining the specular reflectance $\rho_S$(n,m) as the median, mean or weighted mean of the three estimates $\delta_S$(n,m), $\delta_Y$(n,m), $\delta_Z$(n,m), according to the third method the specular reflectance $\rho_S$(n,m) is defined as the mean of only the estimate $\delta_X$(n,m) obtained using the pair of local images I'$_X$ and I'$_{X*}$, and the estimate $\delta_Y$(n,m) obtained using the pair of local images I'$_Y$ and I'$_{Y*}$:

$$\rho_s(n,m) = \frac{\delta_X(n,m) + \delta_Y(n,m)}{2} \quad (24)$$

The separation of albedo into diffuse and specular components $\rho_d$, $\rho_s$ according to the third method may then be used for the first method of separating photometric normals as described hereinbefore.

Third Method of Separating Photometric Normals

A third method of separating photometric normals is the same as the first method, except that instead of performing a color space rotation and calculating the N$_{u,v}$ diffuse normals, an alternative estimate of the diffuse normals is substituted.

The third method is based on the observation of the inventors that under white illumination, the different color channels of measured skin reflectance (or reflectance of any other colored dielectric material) have the same amount of specular reflectance $\rho_s$ mixed with a spectrally varying amount of diffuse reflectance $\rho_d$.

A consequence of this observation is that it is possible to estimate a pure diffuse normal using the difference of the brightest and darkest color channels of reflectance. For human skin, the brightest and darkest color channels are red R and blue B channels respectively, and the diffuse normals may be estimated as N$_{R-B}$ according to:

$$N_{R-B}(n,m) = \frac{(R_X(n,m) - B_{X*}(n,m), R_Y(n,m) - B_{Y*}(n,m), R_Z(n,m) - B_{Z*}(n,m))}{\|(R_X(n,m) - B_{X*}(n,m), R_Y(n,m) - B_{Y*}(n,m), R_Z(n,m) - B_{Z*}(n,m))\|} \quad (25)$$

Subsequently, specular normals N$_{spec}$ and corrected specular normals N$_{corr}$ may be estimated in the same way as the first method, except substituting the normals N$_{R-B}$ for the color space rotation normals N$_{u,v}$.

Figure 13:
FIGS. 13(a) to 13(c) respectively present a comparison between mixed photometric normal, diffuse photometric normals obtained from rotation to a suv color space, and diffuse photometric normals obtained by subtracting the darkest color channel from the brightest color channel.

Referring also to FIG. 13, a comparison is presented between (a) the mixed normals N$_{mixed}$, (b) the normals N$_{u,v}$ obtained by rotation to suv color space according to the first method, and (c) the normals N$_{R-B}$ obtained by subtracting the darkest color channel from the brightest color channel.

It may be observed that compared to the mixed normal N$_{mixed}$, the simple spectral differencing normal N$_{R-B}$ normal exhibits very similar qualitative softness and blur to the diffuse normal N$_{u,v}$ computed using the suv-space projection of the first method. However, the proposed spectral differencing normal N$_{R-B}$ is much simpler and faster to compute. In this way, a spectral differencing step may be used to effectively remove the specular signal, isolating a pure diffuse component Although described and illustrated with reference to human skin for which the brightest color channel for reflectance is red R and the darkest blue B, it will be appreciated that the specific color channels used for the third method may be varied depending on the object or subject being imaged.

The third method of separating photometric normals may employ albedo components $\rho_d$, $\rho_s$ obtained using the first or third methods of albedo separation for calculation of the specular normals N$_{spec}$.

Fourth Method of Separating Photometric Normals

A fourth method of separating photometric normals is the same as the second method of separating photometric normals, except that instead of calculating the blurred normals N$_{blur}$, alternative approximated normals N$_{app}$ are calculated.

The seventh image I$_G$(n,m)={R$_Z$(n,m), G$_X$(n,m), B$_Y$(n, m)} and the eighth image I$_C$(n,m)={R$_{Z*}$(n,m), G$_{X*}$(n,m), B$_{Y*}$(n,m)} may be used to directly compute approximated normals N$_{app}$. Firstly, if not already done so, the values R$_Z$(n,m), G$_X$(n,m), B$_Y$(n,m), R$_{Z*}$(n,m), G$_{X*}$(n,m), B$_{Y*}$(n,m) are normalised to the range 0 to 1. Next, we calculate components (x$_{app}$(n,m), y$_{app}$(n,m), z$_{app}$(n,m)) of the approximated normals N$_{app}$ according to the darker of each binary spherical gradient-complement pair:

$$x_{app} = \begin{cases} 1 - G_X(n,m) & \text{if } G_X(n,m) \leq G_{X*}(n,m) \\ -G_{X*}(n,m) & \text{if } G_X(n,m) > G_{X*}(n,m) \end{cases} \quad (26)$$

$$y_{app} = \begin{cases} 1 - B_Y(n,m) & \text{if } B_Y(n,m) \leq B_{Y*}(n,m) \\ -B_{Y*}(n,m) & \text{if } B_Y(n,m) > B_{Y*}(n,m) \end{cases}$$

$$z_{app} = \begin{cases} 1 - R_Z(n,m) & \text{if } R_Z(n,m) \leq R_{Z*}(n,m) \\ -R_{Z*}(n,m) & \text{if } R_Z(n,m) > R_{Z*}(n,m) \end{cases}$$

Subsequently, the normalised approximated normals N$_{app}$(n,m) are calculated as:

$$N_{app}(n,m) = \frac{(x_{app}(n,m), y_{app}(n,m), z_{app}(n,m))}{\|(x_{app}(n,m), y_{app}(n,m), z_{app}(n,m))\|} \quad (27)$$

The normalised approximated normals $N_{app}(n,m)$ may provide a more accurate estimation of the diffuse normals than the blurred normals $N_{blur}$. With the exception of substituting the blurred normals $N_{blur}$ with the approximated normals $N_{app}$, the fourth method of separating photometric normals is otherwise identical to the second method of separating photometric normals Although described in relation to the seventh and eight images $I_G$, $I_C$, analogous approximated normals $N_{app}$ may also be calculated for white light illumination using the first to sixth images $I_X$, $I_Y$, $I_Z$, $I_{X*}$, $I_{Y*}$, $I_{Z*}$.

MODIFICATIONS

It will be appreciated that various modifications may be made to the embodiments hereinbefore described. Such modifications may involve equivalent and other features which are already known in the processing of images and/or in the design, manufacture and use of image illuminating and/or capturing apparatuses and component parts thereof and which may be used instead of, or in addition to, features already described herein. Features of one embodiment may be replaced or supplemented by features of another embodiment.

Although specific methods of albedo separation and methods of separating photometric normals have been described, any compatible aspects of these methods may be combined interchangeably:

White Light Illumination

For white light illumination to obtain the first to sixth images $I_X$, $I_Y$, $I_Z$, $I_{X*}$, $I_{Y*}$, $I_{Z*}$, albedo separation into diffuse and specular components $\rho_d$, $\rho_s$ may be performed according to the first or third methods based on Equations (3) to (5). Any of the described estimates of diffuse normals $N_{u,v}$, $N_{blur}$, $N_{R-B}$ or $N_{app}$ may then be calculated, although the color-space rotation based normals $N_{u,v}$ or spectral differencing $N_{R-B}$ normals are preferred. Specular normals $N_{spec}$ may then be estimated using the weighted mixture method described in relation to Equations (10) to (13), using any of the described estimates for the diffuse normal $N_{u,v}$, $N_{blur}$, $N_{R-B}$, $N_{app}$ and the diffuse and specular components $\rho_d$, $\rho_s$. Corrected specular normals $N_{corr}$ may then be estimated.

Alternatively, the specular normals $N_{spec}$ may simply be estimated as being equal to a difference map $N_\Delta$ obtained by subtracting one of the described estimates of diffuse normals $N_{u,v}$, $N_{blur}$, $N_{R-B}$ or $N_{app}$ from the mixed normals $N_{mixed}$. In other examples, the specular normals $N_{spec}$ may be estimated as synthetic normals $N_{synth}$ determined based on the mixed normals $N_{mixed}$ and the difference map $N_\Delta$ as described hereinbefore.

Albedo separation into diffuse and specular components $\rho_d$, $\rho_s$ for white light may alternatively be performed using the linear system method described in relation to Equations (18) and (19). This approach needs input in the form of an estimate of the diffuse normals, and any of the described estimates of diffuse normals $N_{u,v}$, $N_{blur}$, $N_{R-B}$ or $N_{app}$ may be used. Specular normals $N_{spec}$ may then be estimated using the weighted mixture method described in relation to Equations (10) to (13), using the diffuse and specular components $\rho_d$, $\rho_s$ and whichever of the described estimates for the diffuse normal $N_{u,v}$, $N_{blur}$, $N_{R-B}$, $N_{app}$ was used to calculated the diffuse and specular components $\rho_d$, $\rho_s$. Corrected specular normals $N_{corr}$ may then be estimated.

Alternatively, the specular normals $N_{spec}$ may simply be estimated as being equal to a difference map $N_\Delta$ obtained by subtracting one of the described estimates of diffuse normals $N_{u,v}$, $N_{blur}$, $N_{R-B}$ or $N_{app}$ from the mixed normals $N_{mixed}$. In other examples, the specular normals $N_{spec}$ may be estimated as synthetic normals $N_{synth}$ determined based on the mixed normals $N_{mixed}$ and the difference map $N_\Delta$ as described hereinbefore.

Spectral Multiplexing

For spectrally multiplexed illumination to obtain the seventh and eighth images $I_G$, $I_C$, albedo separation into diffuse and specular components $\rho_d$, $\rho_s$ for white light may be performed using the linear system method described in relation to Equations (18) and (19). This approach needs input in the form of an estimate of the diffuse normals, and either of the hereinbefore described estimates of diffuse normals $N_{blur}$ or $N_{app}$ may be used for this purpose. The photometric normals $N_{u,v}$ obtained using suv color space rotation cannot be calculated for the seventh and eighth images $I_G$, $I_C$. Similarly, the photometric normals $N_{R-B}$ (obtained from spectral differencing) cannot be calculated for the seventh and eighth images $I_G$, $I_C$.

The specular normals $N_{spec}$ may simply be estimated as being equal to a difference map $N_\Delta$ obtained by subtracting one of the described estimates of diffuse normals $N_{blur}$ or $N_{app}$ from the mixed normals $N_{mixed}$. In other examples, the specular normals $N_{spec}$ may be estimated as synthetic normals $N_{synth}$ determined based on the mixed normals $N_{mixed}$ and the difference map $N_\Delta$ as described hereinbefore.

Subject Motion During Acquisition

The hereinbefore described methods assume no subject motion during acquisition.

However, given the complementary nature of the binary spherical gradient illumination conditions X, Y, Z, X*, Y*, Z*, the motion compensation methods described by Wilson et al. (WGP-10) could be employed, and this document is hereby incorporated by reference in its entirety.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of image processing, comprising:
receiving a set of images of an object, the set of images including images obtained using a camera without a polarising filter and corresponding to binary spherical gradient illumination along first, second and third mutually orthogonal axes and images corresponding to complementary binary spherical gradient illumination along the first, second and third axes;
determining a specular reflectance map of the object and a diffuse reflectance map of the object based on the set of images;
wherein each binary spherical gradient illumination corresponds to uniform illumination from a hemisphere, and the respective complementary binary spherical gradient illumination corresponds to uniform illumination from an opposite hemisphere.

2. A method according to claim 1, further comprising:
receiving a viewpoint vector corresponding to a camera used to obtain the set of images;

generating a set of local images by using a rotation matrix to rotate the illumination conditions of the set of images from the first, second and third mutually orthogonal axes to a set of rotated mutually orthogonal axes defined with respect to the viewpoint vector;

determining a specular reflectance map of the object and a diffuse reflectance map of the object based on the set of local images.

3. A method according to claim 2, comprising receiving multiple sets of images, each set of images corresponding to a different viewpoint vector, and for each set of images:

generating a set of local images by using a rotation matrix to rotate the set of images from the first, second and third mutually orthogonal axes to a set of rotated mutually orthogonal axes defined with respect to the respective viewpoint vector;

determining a specular reflectance map of the object and a diffuse reflectance map of the object based on the set of local images.

4. A method according to claim 1, wherein the set of images comprises six images obtained using white light illumination and corresponding to:

a first image of the object illuminated using binary spherical gradient illumination along the first axis;

a second image of the object illuminated using the complement of the binary spherical gradient illumination along the first axis;

a third image of the object illuminated using binary spherical gradient illumination along the second axis;

a fourth image of the object illuminated using the complement of the binary spherical gradient illumination along the second axis;

a fifth image of the object illuminated using binary spherical gradient illumination along the third axis; and a sixth image of the object illuminated using the complement of the binary spherical gradient illumination along the third axis.

5. A method according to claim 4, wherein determining a specular reflectance map of the object and a diffuse reflectance map of the object based on the set of images comprises, for each pixel:

determining a first estimate of specular reflectance based on a difference in color saturation between the first and second images;

determining a second estimate of specular reflectance based on a difference in color saturation between the third and fourth images;

determining a third estimate of specular reflectance based on a difference in color saturation between the fifth and sixth images; and determining a specular reflectance for the pixel based on the first, second and third estimates.

6. A method according to claim 4, wherein the first to sixth images include data corresponding to two or more color channels, and wherein determining a specular reflectance map of the object and a diffuse reflectance map of the object based on the set of images comprises, for each pixel:

determining an estimate of a diffuse normal;

for one or more color channels of the two or more color channels:

determining a first estimated diffuse reflectance value and a first estimated specular reflectance value by solving a linear system of equations relating the pixel values of the first and second images and a component of the estimated diffuse normal parallel to the first axis;

determining a second estimated diffuse reflectance value and a second estimated specular reflectance value by solving a linear system of equations relating the pixel values of the third and fourth images and a component of the estimated diffuse normal parallel to the second axis;

determining a third estimated diffuse reflectance value and a third estimated specular reflectance value by solving a linear system of equations relating the pixel values of the fifth and sixth images and a component of the estimated diffuse normal parallel to the third axis;

determining the specular reflectance based on the first, second and third estimated specular reflectance values for the one or more color channels; and determining the diffuse reflection map by subtracting the specular reflectance map from a mixed reflectance map.

7. A method according to claim 1, wherein the set of images comprises:

a seventh image of the object illuminated:

along the first axis using either a first binary spherical gradient illumination or its complement, encoded in a first color channel;

along the second axis using either a second binary spherical gradient illumination or its complement, encoded in a second color channel;

along the third axis using either a third binary spherical gradient illumination or its complement, encoded in a third color channel;

an eighth image of the object illuminated:

along the first axis using the other of the first binary spherical gradient illumination and its complement, encoded in the first color channel;

along the second axis using the other of the second binary spherical gradient illumination and its complement, encoded in the second color channel;

along the third axis using the other of the third binary spherical gradient illumination and its complement, encoded in the third color channel.

8. A method according to claim 7, wherein determining a specular reflectance map of the object and a diffuse reflectance map of the object based on the set of images comprises, for each pixel:

determining an estimate of a diffuse photometric normal;

determining a first estimated diffuse reflectance value and a first estimated specular reflectance value by solving a linear system of equations relating the pixel values of the seventh and eighth images for the first color channel and a corresponding component of the estimated diffuse photometric normal parallel to the first axis;

determining a second estimated diffuse reflectance value and a second estimated specular reflectance value by solving a linear system of equations relating the pixel values of the seventh and eighth images for the second color channel and a corresponding component of the estimated diffuse photometric normal parallel to the second axis;

determining a third estimated diffuse reflectance value and a third estimated specular reflectance value by solving a linear system of equations relating the pixel values of the seventh and eighth images for the third color channel and a corresponding component of the estimated diffuse photometric normal parallel to the third axis;

determining the specular reflectance based on the first, second and third estimated specular reflectance values, and determining the diffuse reflection map by subtracting the specular reflectance map from a mixed reflectance map.

9. A method according to claim 1, further comprising determining a diffuse photometric normal map and a specular photometric normal map of the object based on the set of images.

10. A method of image processing, comprising:
receiving a set of images of an object, the set of images obtained using a camera without a polarising filter and including images corresponding to binary spherical gradient illumination along first, second and third mutually orthogonal axes and images corresponding to complementary binary spherical gradient illumination along the first, second and third axes;
determining a diffuse photometric normal map and a specular photometric normal map of the object based on the set of images;
wherein each binary spherical gradient illumination corresponds to uniform illumination from a hemisphere, and the respective complementary binary spherical gradient illumination corresponds to uniform illumination from an opposite hemisphere.

11. A method according to claim 10, further comprising:
receiving a viewpoint vector corresponding to a camera used to obtain the set of images;
generating a set of local images by using a rotation vector to rotate the illumination conditions of the set of images from the first, second and third mutually orthogonal axes to a set of rotated mutually orthogonal axes defined with respect to the viewpoint vector;
determining a diffuse photometric normal map and a specular photometric normal map of the object based on the set of local images.

12. A method according to claim 11, comprising receiving multiple sets of images, each set of images corresponding to different viewpoint vector, and for each set of images:
generating a set of local images by using a rotation vector to rotate the illumination conditions of each of the set of images from the first, second and third mutually orthogonal axes to a set of rotated mutually orthogonal axes defined with respect to the respective viewpoint vector;
determining a diffuse photometric normal map and a specular photometric normal map of the object based on the set of local images.

13. A method according to claim 10, wherein the set of images comprises six images obtained using white light illumination and corresponding to:
a first image of the object illuminated using binary spherical gradient illumination along the first axis;
a second image of the object illuminated using the complement of the binary spherical gradient illumination along the first axis;
a third image of the object illuminated using binary spherical gradient illumination along the second axis;
a fourth image of the object illuminated using the complement of the binary spherical gradient illumination along the second axis;
a fifth image of the object illuminated using binary spherical gradient illumination along the third axis; and
a sixth image of the object illuminated using the complement of the binary spherical gradient illumination along the third axis.

14. A method according to claim 13, wherein determining a diffuse normal map and a specular normal map of the object based on the set of images comprises:
determining a mixed photometric normal map;
determining the diffuse photometric normal map;
for each pixel:
determining the specular photometric normal based on modelling the mixed photometric normal as a spatially-varying, a-priori unknown weighted sum of the determined diffuse photometric normal and an unknown specular photometric normal, and solving for the specular photometric normal by first determining the unknown weights of summation.

15. A method according to claim 14, wherein determining the diffuse photometric normal map comprises:
transforming the first to sixth images into an suv color space;
for each pixel, determining the diffuse photometric normal based on the u and v values of the first to sixth images in suv color space.

16. A method according to claim 14, wherein the first to sixth images include data corresponding to two or more color channels, and wherein determining the diffuse photometric normal map comprises:
for each pixel, determining the diffuse photometric normal based on the values of the first to sixth images corresponding to a brightest color channel and a darkest color channel.

17. A method according to claim 10, wherein the set of images comprises:
a seventh image of the object illuminated:
along the first axis using either a first binary spherical gradient illumination or its complement, encoded in a first color channel;
along the second axis using either a second binary spherical gradient illumination or its complement, encoded in a second color channel;
along the third axis using either a third binary spherical gradient illumination or its complement, encoded in a third color channel;
an eighth image of the object illuminated:
along the first axis using the other of the first binary spherical gradient illumination and its complement, encoded in the first color channel;
along the second axis using the other of the second binary spherical gradient illumination and its complement, encoded in the second color channel;
along the third axis using the other of the third binary spherical gradient illumination and its complement, encoded in the third color channel.

18. A method according to claim 17, wherein determining a diffuse normal map and a specular normal map of the object based on the set of images comprises:
determining a mixed photometric normal map;
for each pixel:
determining a component of a diffuse photometric normal parallel to the first axis based on the darkest pixel value of the seventh and eighth images in the first color channel;
determining a component of a diffuse photometric normal parallel to the second axis based on the darkest pixel value of the seventh and eighth images in the second color channel;
determining a component of a diffuse photometric normal parallel to the third axis based on the darkest pixel value of the seventh and eighth images in the third color channel;
determining the specular photometric normal map based on subtracting the diffuse photometric map from the mixed photometric map.

19. A method according to claim 10, further comprising determining a specular reflectance map of the object and a diffuse reflectance map of the object based on the set of images.

20. A method comprising:
    illuminating an object:
        along the first axis using either a first binary spherical gradient illumination or its complement, encoded in a first color channel;
        along the second axis using either a second binary spherical gradient illumination or its complement, encoded in a second color channel;
        along the third axis using either a third binary spherical gradient illumination or its complement, encoded in a third color channel;
    acquiring a first image of the object using an image capturing device without a polarising filter;
    illuminating the object:
        along the first axis using the other of the first binary spherical gradient illumination and its complement, encoded in the first color channel;
        along the second axis using the other of the second binary spherical gradient illumination and its complement, encoded in the second color channel;
        along the third axis using the other of the third binary spherical gradient illumination and its complement, encoded in the third color channel;
    acquiring a second image of the object using the image capturing device;
    wherein each binary spherical gradient illumination corresponds to uniform illumination from a hemisphere, and the respective complementary binary spherical gradient illumination corresponds to uniform illumination from an opposite hemisphere.

* * * * *